United States Patent
Li et al.

(10) Patent No.: US 10,706,371 B2
(45) Date of Patent: Jul. 7, 2020

(54) DATA PROCESSING TECHNIQUES

(71) Applicant: Accenture Global Solutions Limited, Dublin (IE)

(72) Inventors: Timothy Li, Milpitas, CA (US); Alex Kass, Palo Alto, CA (US); Upendra Chintala, Bangalore (IN); Manish Mehta, Sunnyvale, CA (US)

(73) Assignee: Accenture Global Solutions Limited, Dublin (IE)

( * ) Notice: Subject to any disclaimer, the term of this patent is extended or adjusted under 35 U.S.C. 154(b) by 1231 days.

(21) Appl. No.: 14/960,778

(22) Filed: Dec. 7, 2015

(65) Prior Publication Data

US 2016/0267425 A1 Sep. 15, 2016

(30) Foreign Application Priority Data

Mar. 12, 2015 (IN) ............................ 1227/CHE/2015

(51) Int. Cl.
*G06Q 10/06* (2012.01)
*G06N 5/02* (2006.01)
*G06Q 10/10* (2012.01)

(52) U.S. Cl.
CPC ........... *G06Q 10/0631* (2013.01); *G06N 5/02* (2013.01); *G06Q 10/103* (2013.01)

(58) Field of Classification Search
CPC ..... G06Q 10/0631; G06Q 10/103; G06N 5/02
See application file for complete search history.

(56) References Cited

U.S. PATENT DOCUMENTS

| 5,960,404 | A | * | 9/1999 | Chaar | G06F 9/5038 |
|---|---|---|---|---|---|
| | | | | | 705/7.26 |
| 7,389,211 | B2 | * | 6/2008 | Abu El Ata | G06F 17/10 |
| | | | | | 703/2 |
| 7,707,057 | B2 | * | 4/2010 | Ward | G06Q 10/06311 |
| | | | | | 705/2 |
| 8,024,211 | B1 | * | 9/2011 | Cohen | G06Q 10/06 |
| | | | | | 705/7.14 |
| 8,126,742 | B2 | * | 2/2012 | Bond, Jr. | G06Q 40/08 |
| | | | | | 705/4 |
| 8,468,042 | B2 | * | 6/2013 | Jaluka | G06Q 10/063112 |
| | | | | | 705/7.11 |

(Continued)

OTHER PUBLICATIONS

Ciceri, Eleonora. "Humans in the loop: optimization of active and passive crowdsourcing." (2015). (Year: 2015).*

*Primary Examiner* — Tiphany B Dickerson
(74) *Attorney, Agent, or Firm* — Harrity & Harrity, LLP

(57) ABSTRACT

A device may include one or more processors. The device may receive first data to be processed. The device may receive information identifying a plurality of tasks to be performed to process the first data. The device may determine that one or more first tasks, of the plurality of tasks, are to be performed by an automation device, and that one or more second tasks, of the plurality of tasks, are to be performed by workers. The device may provide, to the automation device and to the workers, the first data. The device may receive, from the automation device and the workers, second data. The second data may be generated based on the automation device performing the one or more first tasks and based on the workers performing the one or more second tasks.

20 Claims, 15 Drawing Sheets

(56) References Cited

U.S. PATENT DOCUMENTS

| | | | | |
|---|---|---|---|---|
| 8,554,596 B2* | 10/2013 | Bailey | G06Q 10/06 | 705/7.12 |
| 8,554,605 B2* | 10/2013 | Oleson | G06Q 10/06311 | 705/7.41 |
| 8,639,650 B1* | 1/2014 | Gill | G06N 5/04 | 706/61 |
| 8,650,194 B2* | 2/2014 | Hu | G06Q 10/00 | 707/737 |
| 8,990,068 B2* | 3/2015 | Orsini | G06Q 10/107 | 704/2 |
| 9,092,749 B2* | 7/2015 | Kern | G06Q 10/063112 | |
| 9,305,263 B2* | 4/2016 | Horvitz | G06N 5/043 | |
| 9,430,299 B2* | 8/2016 | Naveh | G06F 9/5088 | |
| 9,436,921 B2* | 9/2016 | Whitmore | G06Q 10/06 | |
| 9,489,624 B2* | 11/2016 | Dasgupta | G06N 5/02 | |
| 9,536,517 B2* | 1/2017 | Williams | G10L 15/01 | |
| 9,842,307 B2* | 12/2017 | Vaya | G06Q 10/06316 | |
| 10,419,616 B2* | 9/2019 | Kan | H04M 3/5232 | |
| 2007/0067145 A1* | 3/2007 | Miller | G06Q 10/06 | 703/6 |
| 2007/0100669 A1* | 5/2007 | Wargin | G06Q 30/0225 | 705/4 |
| 2008/0046386 A1* | 2/2008 | Pieraccinii | G06Q 10/10 | 705/402 |
| 2010/0332281 A1* | 12/2010 | Horvitz | G06Q 10/06311 | 705/7.13 |
| 2012/0016705 A1* | 1/2012 | Milojicic | G06Q 10/04 | 705/7.11 |
| 2012/0101864 A1* | 4/2012 | Milojicic | G06Q 10/00 | 705/7.12 |
| 2012/0265573 A1* | 10/2012 | Van Pelt | G06Q 10/06311 | 705/7.14 |
| 2012/0265574 A1* | 10/2012 | Olding | G06Q 10/06 | 705/7.14 |
| 2013/0066961 A1* | 3/2013 | Naik | G06Q 10/10 | 709/204 |
| 2013/0197954 A1* | 8/2013 | Yankelevich | G06Q 30/02 | 705/7.13 |
| 2014/0108183 A1* | 4/2014 | Davis | G06O 30/0611 | 705/26.4 |
| 2014/0136254 A1* | 5/2014 | Das | G06Q 10/06311 | 705/7.14 |
| 2014/0344191 A1* | 11/2014 | Lebow | G06N 5/02 | 706/11 |
| 2015/0242447 A1* | 8/2015 | Ipeirotis | G06F 16/215 | 705/14.45 |
| 2015/0317582 A1* | 11/2015 | Nath | G06Q 10/06 | 705/7.13 |
| 2015/0332188 A1* | 11/2015 | Yankelevich | G06Q 30/02 | 705/7.13 |
| 2015/0356476 A1* | 12/2015 | Agarwal | G06Q 10/06 | 705/7.27 |
| 2016/0019484 A1* | 1/2016 | Srivastava | G06Q 10/06313 | 705/7.17 |
| 2016/0041849 A1* | 2/2016 | Naveh | G06F 9/5088 | 718/104 |
| 2016/0162478 A1* | 6/2016 | Blassin | G06F 40/58 | 706/12 |
| 2016/0162837 A1* | 6/2016 | Muntes Mulero | G06Q 10/103 | 705/301 |
| 2017/0076246 A1* | 3/2017 | Volkov | G06N 5/04 | |

* cited by examiner

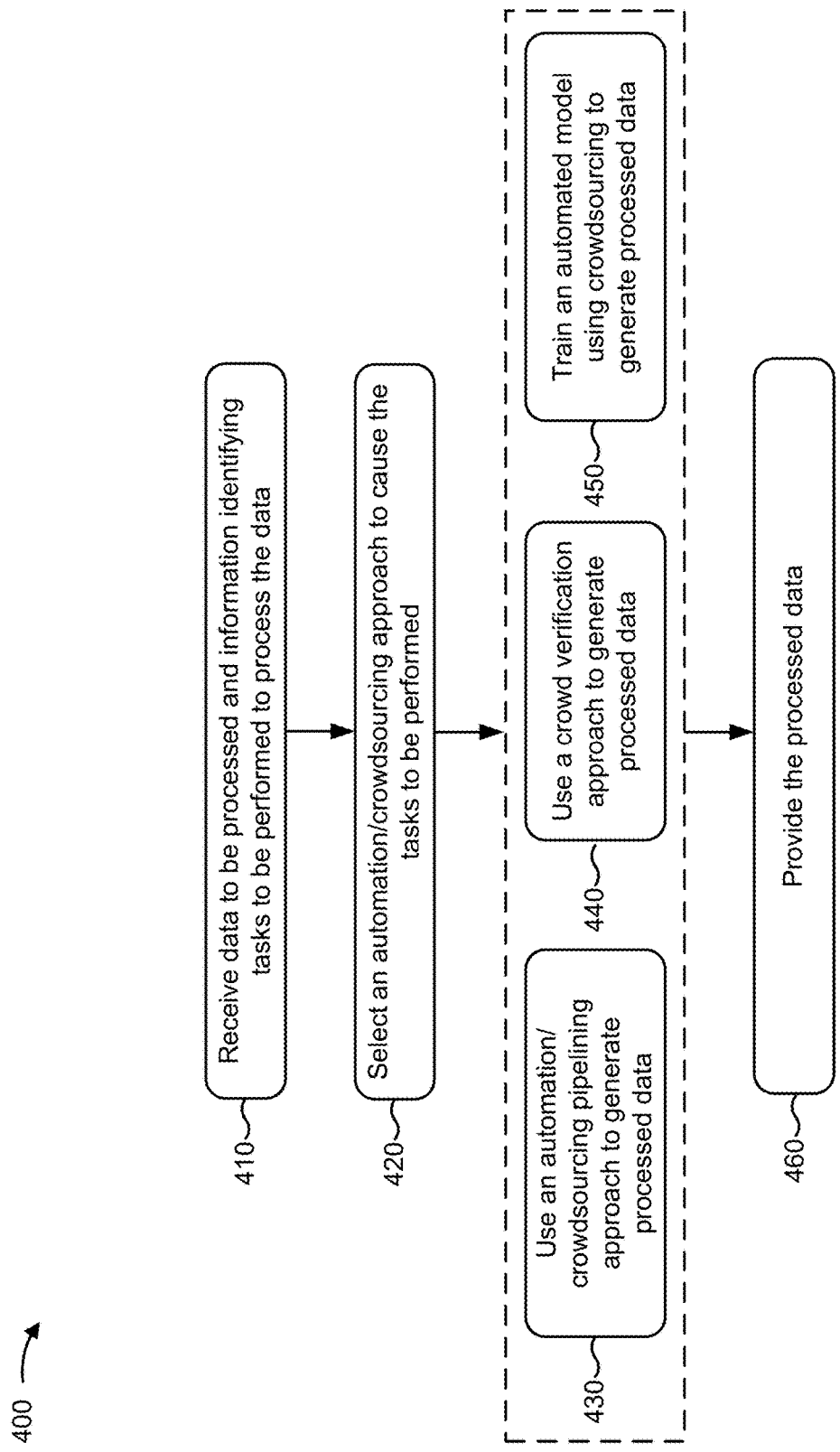

DATA PROCESSING TECHNIQUES

RELATED APPLICATION

This application claims priority under 35 U.S.C. § 119 to Indian Provisional Patent Application No. 1227/CHE/2015, filed on Mar. 12, 2015, the content of which is incorporated by reference herein in its entirety.

BACKGROUND

A device may receive data and may process the data to generate processed data. In some cases, the device may perform the data processing automatically (e.g., based on a rule for processing the data). In other cases, the device may provide the data to workers, and the workers may perform tasks to generate the data.

SUMMARY

According to some possible implementations, a device may include one or more processors. The device may receive first data to be processed. The device may receive information identifying a plurality of tasks to be performed to process the first data. The device may determine, based on the information identifying the plurality of tasks, that one or more first tasks, of the plurality of tasks, are to be performed by an automation device, and that one or more second tasks, of the plurality of tasks, are to be performed by workers. The device may provide, to the automation device and to the workers, the first data. The device may cause the automation device to perform the one or more first tasks and the workers to perform the one or more second tasks. The device may receive, from the automation device and the workers, second data. The second data may be generated based on the automation device performing the one or more first tasks and based on the workers performing the one or more second tasks.

According to some possible implementations, a non-transitory computer-readable medium may store one or more instructions that, when executed by one or more processors, may cause the one or more processors to receive first data to be processed. The one or more instructions, when executed by the one or more processors, may cause the one or more processors to receive information identifying a plurality of tasks to be performed to generate second data based on the first data. The one or more instructions, when executed by the one or more processors, may cause the one or more processors to determine, based on the information identifying the plurality of tasks, that a first task, of the plurality of tasks, is to be performed by workers, and that a second task, of the plurality of tasks, is to be automatically performed by an automation device. The one or more instructions, when executed by the one or more processors, may cause the one or more processors to provide, to the workers or the automation device, the first data. The one or more instructions, when executed by the one or more processors, may cause the one or more processors to cause the workers to perform the first task. The one or more instructions, when executed by the one or more processors, may cause the one or more processors to cause the automation device to perform the second task. The one or more instructions, when executed by the one or more processors, may cause the one or more processors to receive, from the automation device or the workers, the second data. The second data may be generated based on the workers performing the first task and based on the automation device performing the second task.

According to some possible implementations, a method may include receiving, by a device, first data to be processed. The method may include receiving, by the device, information identifying a plurality of tasks to be performed to generate second data based on the first data. The method may include determining, by the device and based on the information identifying the plurality of tasks, that a first task, of the plurality of tasks, is to be performed by workers, and that a second task, of the plurality of tasks, is to be performed by an automation device. The method may include providing, by the device and to the workers or the automation device, the first data. The method may include causing, by the device, the workers to perform the first task. The method may include causing, by the device, the automation device to perform the second task. The method may include receiving, by the device and from the automation device or the workers, the second data. The second data may be generated based on the workers performing the first task and based on the automation device performing the second task.

BRIEF DESCRIPTION OF THE DRAWINGS

FIG. 4 is a flow chart of an example process for processing data using automated techniques and crowdsourced techniques.

DETAILED DESCRIPTION

The following detailed description of example implementations refers to the accompanying drawings. The same reference numbers in different drawings may identify the same or similar elements.

Many tasks in the digital era involve processing (e.g., cleansing, labeling, enriching, or the like) large streams of data. The data is often unstructured and complex to process. Automated analytics and machine learning techniques continue to mature but still cannot always completely address the need to process the data. Human judgment may be utilized to help train automated techniques and/or handle cases that the automated techniques cannot handle. Crowdsourcing platforms may be used to stream tasks requiring human judgment to a crowd that processes data for a small charge per data item, or for no charge per data item.

Systems and/or methods, described herein, may provide a crowdsourced data enrichment platform that utilizes automated techniques, paid crowdsourcing, and free crowdsourcing to process data. The systems and/or methods may use the processed data to perform a function, such as identifying products (e.g., anything that may be marketed or sold as a commodity or a good) and/or services (e.g., any act or variety of work done for others) to offer for sale, creating a website, creating an application, providing customer service, or the like. In some cases, the systems and/or methods may recommend whether to automate a particular task or to provide the particular task to a crowd for performance. In some implementations, the systems and/or methods may generate a workflow that includes automated steps and crowdsourced steps for a set of tasks. The systems and/or methods may permit experimentation with different data elements, prices, workflows, various combinations of crowdsourcing and automated techniques, or the like. In some implementations, the systems and/or methods may utilize free game-based crowdsourcing to process the data and complement the paid crowdsourcing.

In this way, a data enrichment platform determines one or more automation/crowdsourcing approaches for processing data, which conserves processor resources associated with an automation device, and conserves organizational resources (e.g., time, money, etc.) that would otherwise be used to cause a crowd to perform automatable tasks.

Figure 1A:
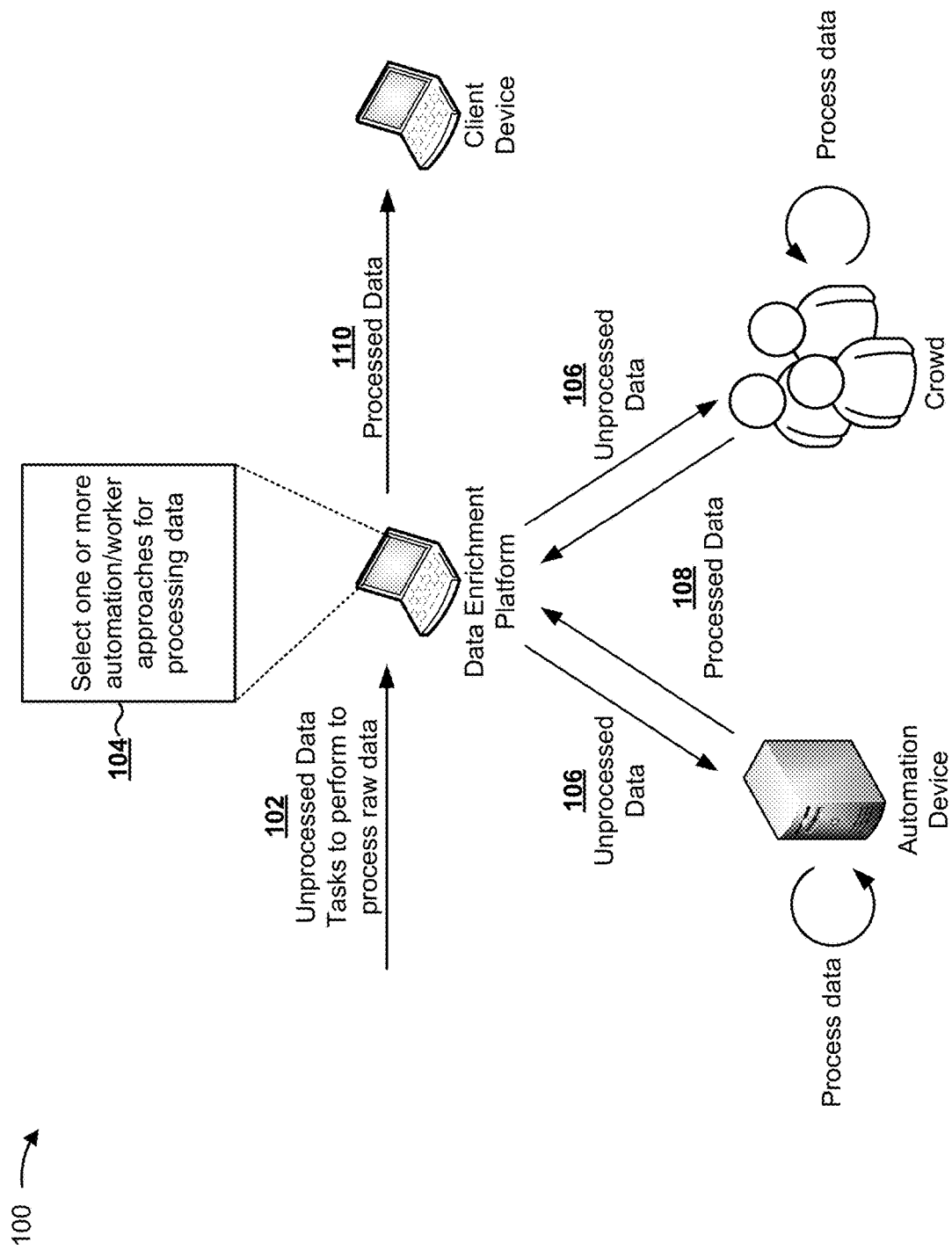
FIGS. 1A-1D are diagrams of an overview of an example implementation described herein.

FIGS. 1A-1D are diagrams of an overview of an example implementation 100 described herein. As shown in FIG. 1A, and by reference number 102, a data enrichment platform may receive unprocessed data. The unprocessed data may include, for example, an image, a text string, an audio file, a video file, a link to a data structure that stores the unprocessed data, an address of a data structure that stores the unprocessed data, or the like, as described in more detail in connection with FIG. 4, below. As further shown, the data enrichment platform may receive information identifying tasks to perform to process the unprocessed data. The tasks may include parsing the unprocessed data, assigning tags to the unprocessed data, identifying emotions conveyed by the unprocessed data, or the like. Some tasks may be more efficiently performed by a crowd of workers (e.g., based on a time required to perform the task, a cost required to have the workers perform the task, human intuition required to process the unprocessed data, etc.), and other tasks may be more efficiently performed by an automation device (e.g., data processing, data conversion, machine-learning-based tasks, etc.).

As shown by reference number 104, the data enrichment platform may select one or more automation/worker approaches for processing the unprocessed data. An automation/worker approach may associate the tasks to be performed with crowds and/or automation devices to perform the tasks. For example, the automation/worker approach may include a pipelining approach, a worker verification approach, an approach involving training of an automation model, or the like, as described in more detail below.

In some implementations, the data enrichment platform may select the one or more automation/worker approaches automatically. For example, the data enrichment platform may analyze the unprocessed data (e.g., a format of the unprocessed data, a source of the unprocessed data, information associated with the unprocessed data, a type of the unprocessed data, a task to be performed with regard to the unprocessed data, a goal to be accomplished with regard to the unprocessed data, etc.) to select the one or more automation/worker approaches. In some implementations, the data enrichment platform may identify an automation/worker approach based on task types associated with the tasks to be performed. In some implementations, the data enrichment program may provide an interface for a user to input information relating to one or more automation/worker approaches. For example, a user may specify an automation/worker approach for processing the data, may specify particular tasks and/or processes to be performed by an automation device and/or a worker (e.g., of a paid crowd and/or a free crowd), or the like.

As shown by reference number 106, the data enrichment platform may provide the unprocessed data to an automation device and/or one or more crowds. For example, based on the automation/worker approach, the data enrichment platform may provide unprocessed data to an automation device for processing and/or enriching, and may provide unprocessed data (e.g., the same unprocessed data that is provided to the automation device, different unprocessed data than is provided to the automation device, etc.) to one or more crowds for processing and/or enriching. As shown, the automation device and the crowds may process the unprocessed data to generate processed data. As shown by reference number 108, the data enrichment platform may receive the processed data from the automation device and/or the one or more crowds.

As shown by reference number 110, the data enrichment platform may provide the processed data to a client device. In some implementations, the data enrichment platform may receive data from the automation device and/or the one or more crowds, and may process the data before providing processed data to the client device. For example, the data enrichment platform may format the data in a particular way, may process the data to determine whether received data is accurate (e.g., based on comparing known information to received information to determine whether the received information matches the known information), or the like, and may provide the processed data to the client device. In this way, the data enrichment platform conserves processor power of the data enrichment platform and the automation platform, time, and crowdsourcing resources by selecting one or more automation/worker approaches, and by causing unprocessed data to be processed based on the one or more automation/worker approaches.

Figure 1B:
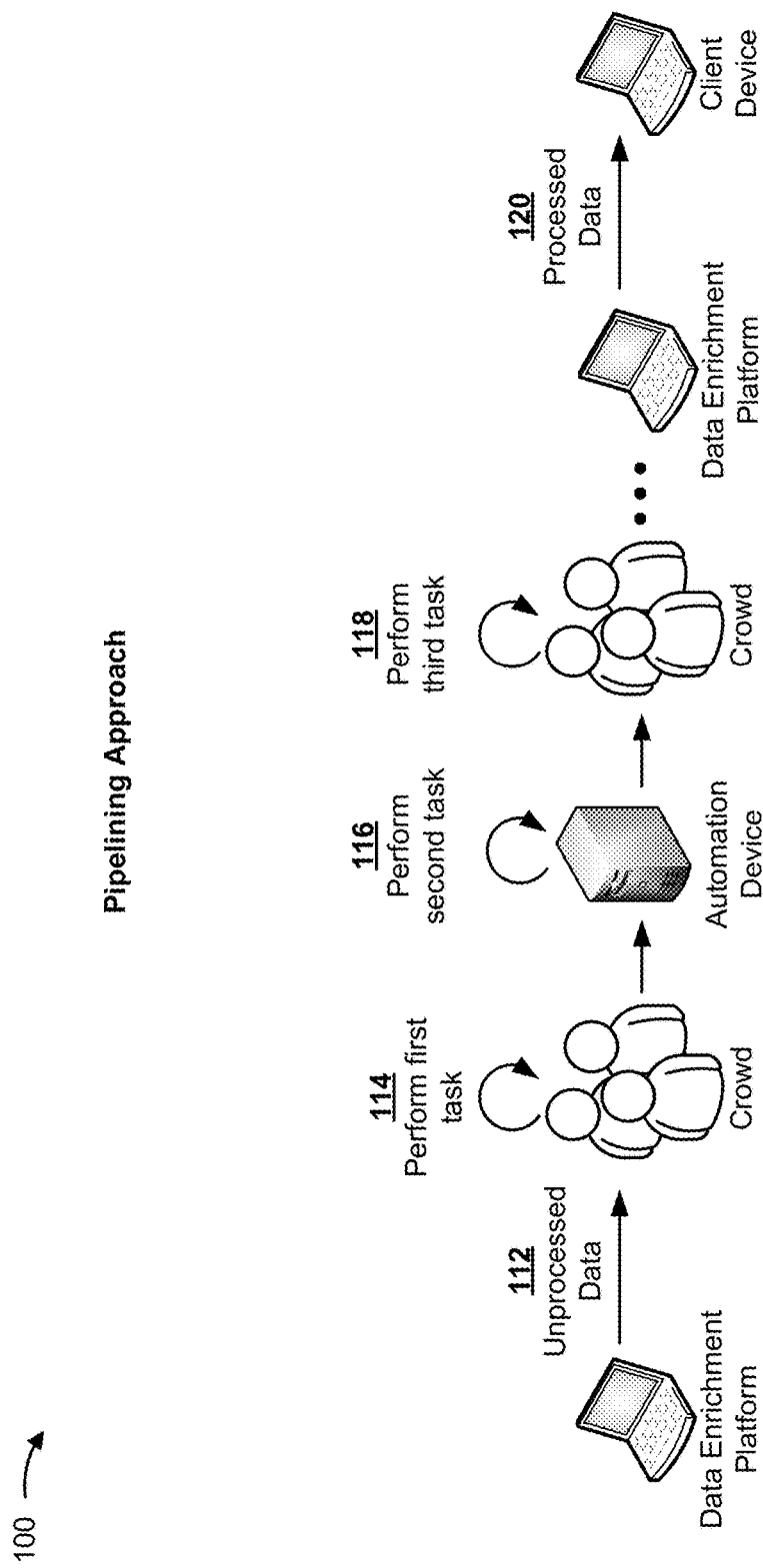
Figure 1C:
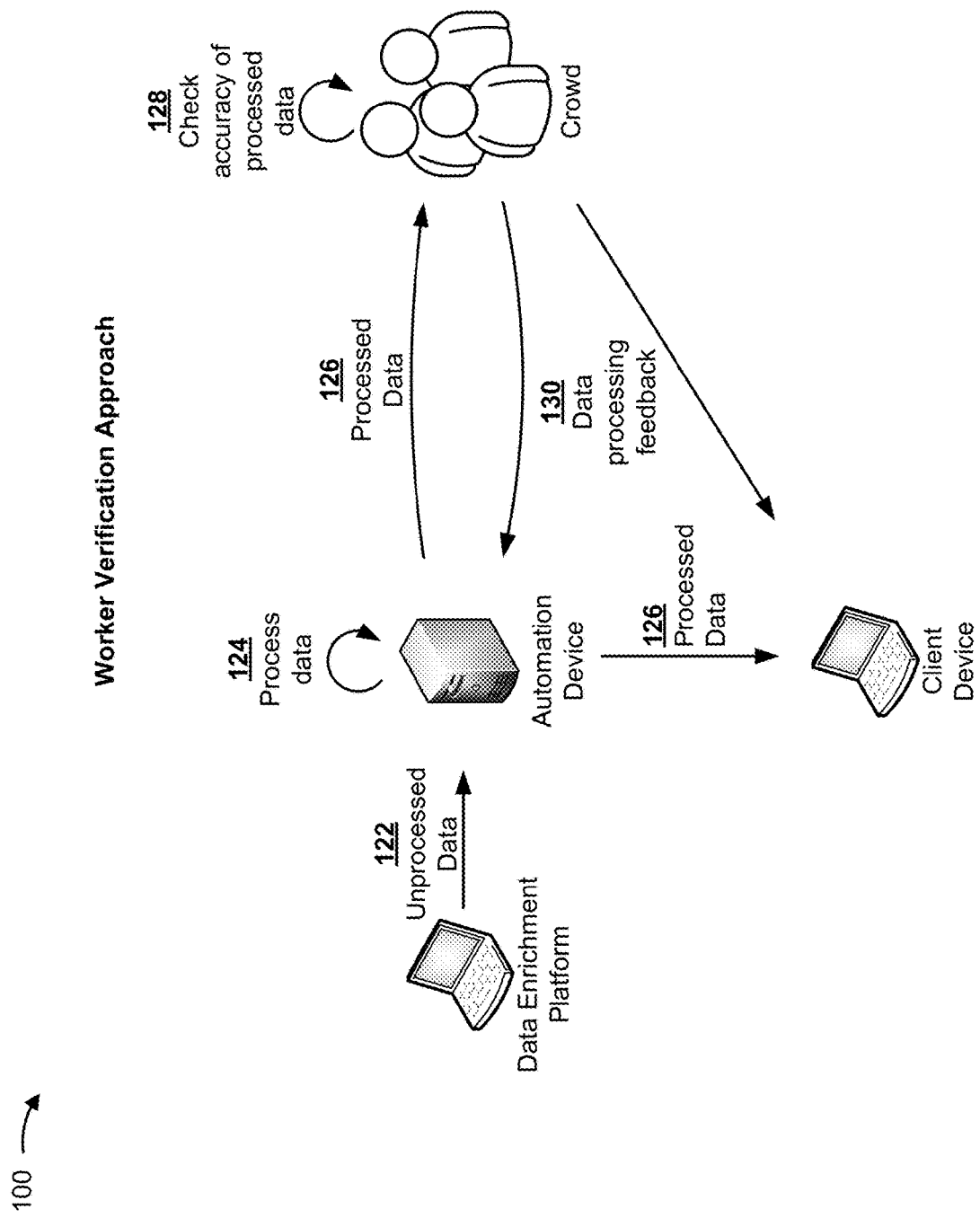
Figure 1D:
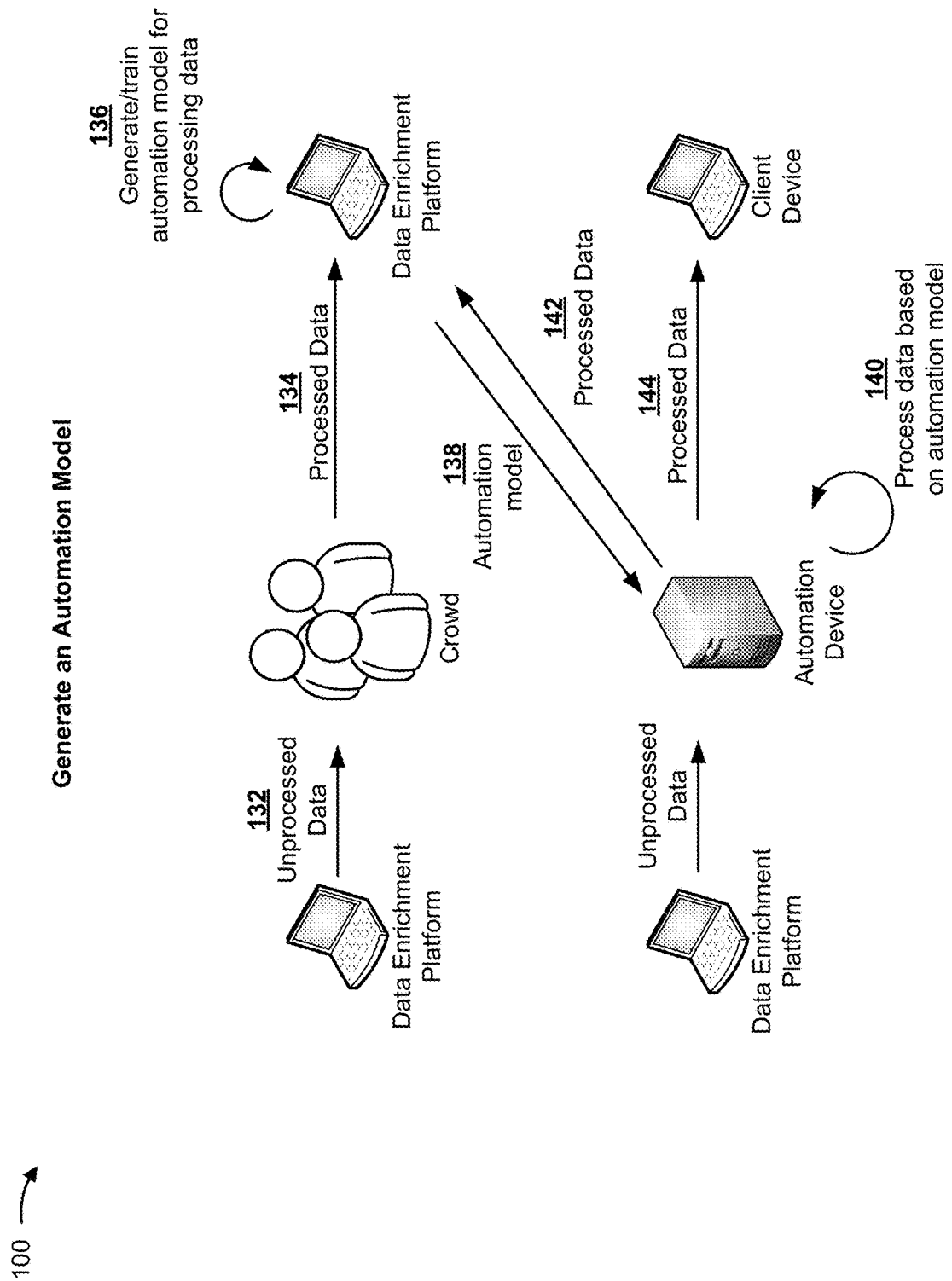

FIGS. 1B-1D are diagrams of example automation/worker approaches that may be selected by the data enrichment platform to process data. As shown in FIG. 1B, in some implementations, the data enrichment platform may select an automation/worker pipelining approach to process unprocessed data. An automation/worker pipelining approach may include multiple, different entities (e.g., one or more crowds and one or more automation devices) that are to perform a sequence of tasks (e.g., in series, in parallel, a combination of in series and in parallel, etc.). For example, assume that a first task, then a second task, and then a third task are to be performed in sequence to process unprocessed data. As shown by reference number 112, the data enrichment platform may provide the unprocessed data to a first crowd (e.g., a paid crowd, a free crowd, etc.). As shown by reference number 114, the first crowd may perform a crowd-based operation to perform the first task. For example, the first crowd may attach tags to the unprocessed data, may sort the unprocessed data, may remove irrelevant data from the unprocessed data, or the like. As shown, after performing the first task, the first crowd may provide the data to an automation device. In some implementations, the first crowd may provide the data to the data enrichment platform, and the data enrichment platform may provide the data to the automation device.

As shown by reference number 116, the automation device may perform a second task with regard to the data received from the first crowd. For example, the automation device may cause a search to be performed based on tags associated with the data, may perform a data mining operation on the data, may perform mathematical operations based on the data, may use a machine learning algorithm with regard to the data, or the like. In some cases, the automation device may be associated with the data enrichment platform (e.g., included in the data enrichment platform, associated with the same device as the data enrichment platform, etc.). In some cases, the automation device may be separate from the data enrichment platform. As further shown, the automation device may provide the data to a second crowd (e.g., directly, via the data enrichment platform, etc.).

As shown by reference number 118, the second crowd may perform the third task. For example, the second crowd may evaluate accuracy of processing performed by the first crowd and/or the automation device, may select relevant information from the results provided by the first crowd and/or the automation device, or the like. As further shown, after performing the third task, the second crowd may provide the processed data. For example, the second crowd may provide the processed data to the data enrichment platform (e.g., when the third task is the final task in the automation/worker pipelining approach) or to another crowd and/or automation device (e.g., when one or more additional tasks are to be performed in the automation/worker pipelining approach). As shown by reference number 120, the data enrichment platform may provide the processed data to a client device. In this way, the data enrichment platform facilitates data processing based on an automation/worker pipelining approach, which conserves processor resources, organization time, and organization money that would otherwise be used to process the data and/or to manually provide the data for processing by the one or more crowds and/or the automation device.

As shown in FIG. 1C, in some implementations, the data enrichment platform may use a worker verification approach to process the unprocessed data. A worker verification approach may use one or more worker to verify authenticity and/or accuracy of data processing tasks performed by an automation device. As shown by reference number 122, the data enrichment platform may provide unprocessed data to an automation device. As shown by reference number 124, the automation device may process the unprocessed data (e.g., based on a rule, using an automation model, using an algorithm, using a software program, using machine learning, using artificial intelligence, etc.) to generate processed data. For example, the automation device may detect textual strings (e.g., addresses, names, phone numbers, parts of speech, etc.) in a body of text, may identify faces of people shown in photographs, may classify audio recordings (e.g., based on an emotion conveyed by a voice in the audio recording, a genre of a song in the audio recording, etc.), or the like.

As shown by reference number 126, the automation device may provide the processed data to a client device and/or a crowd. In some implementations, the automation device may provide the processed data to a data enrichment platform, and the data enrichment platform may provide the processed data to the crowd. As shown by reference number 128, the crowd may check accuracy of the processed data and/or the task performed by the automation device. For example, if the automation device detects textual strings in the data, workers of the crowd may check the accuracy of the detection process (e.g., may check that the automation device detected correct textual strings, may check textual strings for which a confidence score associated with the detection process is low, may check a random subset of detected textual strings, etc.).

As shown by reference number 130, the workers may provide data processing feedback to the automation device and/or the data enrichment platform. Based on the data processing feedback, the automation device and/or the data enrichment platform may improve the data processing process. For example, the automation device may implement a machine learning algorithm that improves parameters for processing unprocessed data based on comparing predicted results (e.g., the processed data) to actual results (e.g., the data processing feedback). In this way, the workers improves accuracy of the data processing process, which reduces processor consumption of the automation device and saves time and resources that would otherwise be used to cause a worker to process the data.

As shown in FIG. 1D, in some implementations, the data enrichment platform may generate an automation model. The automation device may process unprocessed data based on the automation model. For example, the automation model may identify operations to perform on unprocessed data to generate processed data (e.g., text recognition operations, facial recognition operations, voice recognition operations, etc.).

As shown by reference number 132, the data enrichment platform may provide unprocessed data to a set of workers, and the set of workers may process the unprocessed data to generate processed data. As shown by reference number 134, the data enrichment platform may receive the processed data from the set of workers. As shown by reference number 136, the data enrichment platform may generate the automation model based on the processed data. For example, the operations identified by the automation model may be associated with parameters. The data enrichment platform may determine a relationship between unprocessed data and processed data received from the set of workers, and may configure the parameters based on the relationship to generate the automation model.

As shown by reference number 138, the data enrichment platform may provide the automation model to the automation device. As shown by reference number 140, the automation device may process unprocessed data, received from the data enrichment platform, based on the automation model. As shown by reference number 142, in some cases, the automation device may provide processed data to the data enrichment platform. The data enrichment platform may train the automation model based on the processed data received from the automation device. For example, the data enrichment platform may compare received processed data (e.g., received from the automation device) to expected data (e.g., expected data that is obtained from one or more crowds, from a user of the data enrichment platform, etc.). Based on comparing the received processed data to the expected data, the data enrichment platform may modify parameters of the automation model to improve performance of the automation model. In this way, the data enrichment platform conserves processor resources of the automation device by improving accuracy of the automation model. As shown by reference number 144, in some cases, the automation device may provide the processed data to a client device.

In this way, a data enrichment platform determines one or more automation/worker approaches for processing data, which conserves processor resources associated with an automation device, and conserves organizational resources (e.g., time, money, etc.) that would otherwise be used to cause a crowd to perform automatable tasks.

Figure 2:
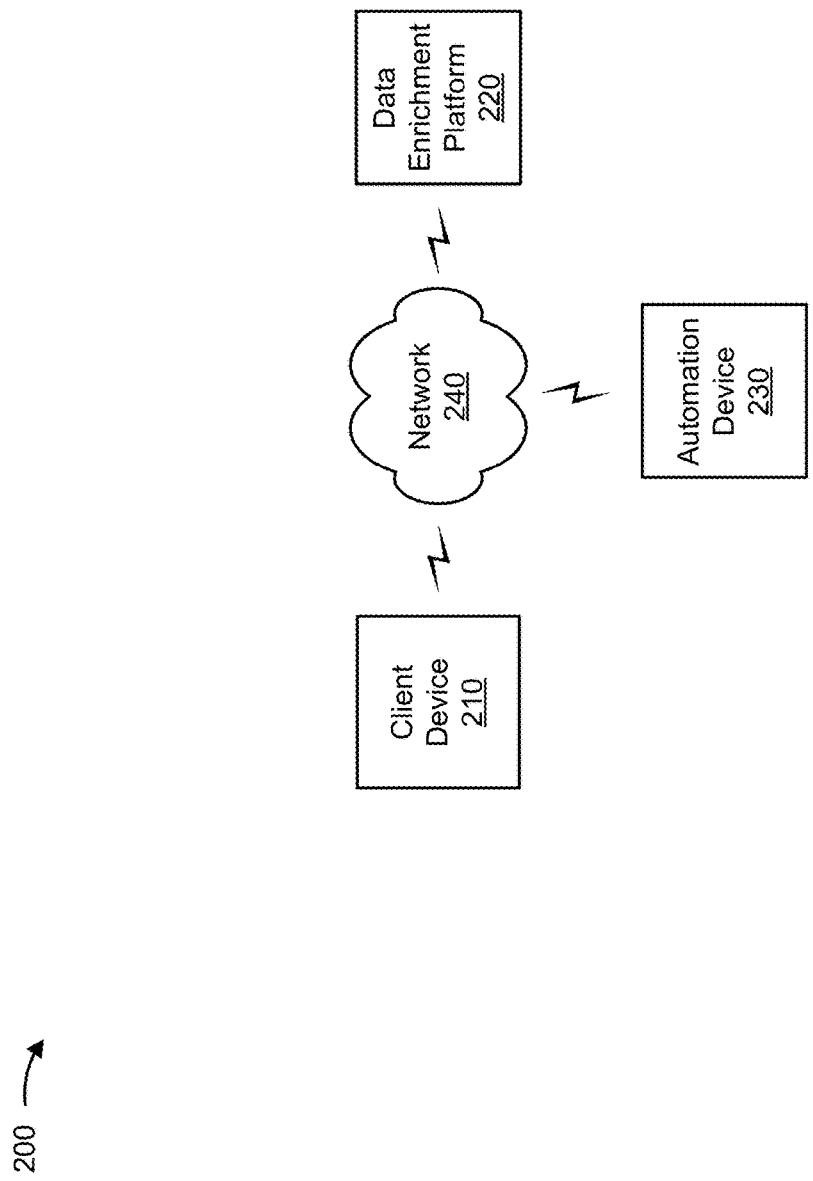
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a data enrichment platform 220, an automation device 230, and a network 240. Devices of environment 200 may interconnect via wired connections, wireless connections, or a combination of wired and wireless connections.

Client device 210 may include a device capable of receiving, generating, storing, processing, and/or providing information, such as information described herein. For example, client device 210 may include a communication and computing device (e.g., a desktop computer, a laptop computer, a tablet computer, a handheld computer, a server, etc.), a mobile phone (e.g., a smart phone, a radiotelephone, etc.), or a similar device. In some implementations, client device 210 may receive information from and/or transmit information to another device of environment 200.

Data enrichment platform 220 may include one or more devices capable of receiving, generating, storing, processing, and/or providing information, such as information described herein. For example, data enrichment platform 220 may include a computing device, such as a server, a desktop computer, a laptop computer, a tablet computer, a handheld computer, or a similar device. In some implementations, data enrichment platform 220 may receive information from and/or transmit information to one or more other devices of environment 200.

Automation device 230 may include one or more devices capable of receiving, generating, storing, processing, and/or providing information, such as information described herein. For example, automation device 230 may include a computing device, such as a server, a desktop computer, a laptop computer, a tablet computer, a handheld computer, or a similar device. In some implementations, automation device 230 may receive information from and/or transmit information to one or more other devices of environment 200.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
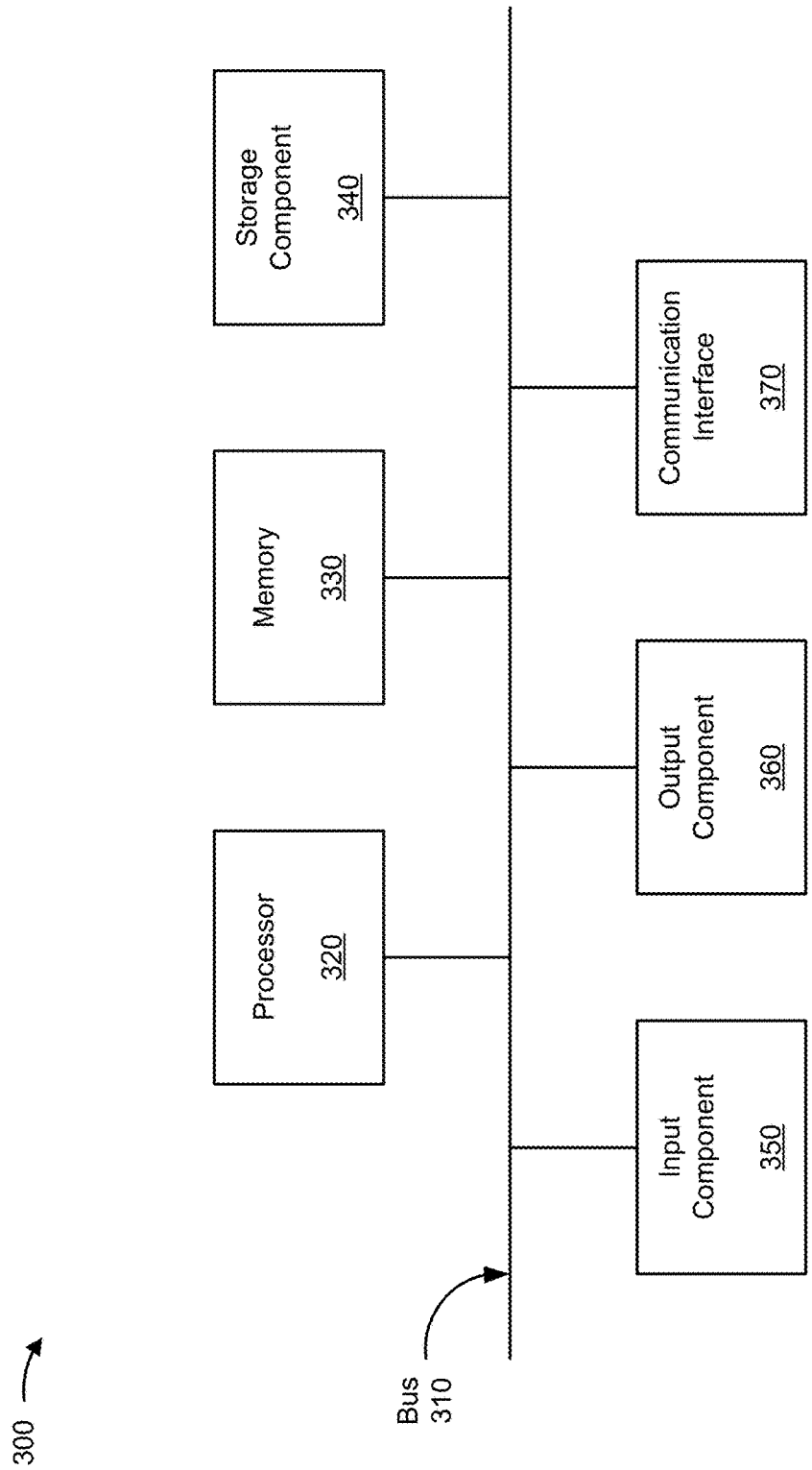
FIG. 3 is a diagram of example components of one or more devices of FIG. 2.

FIG. 3 is a diagram of example components of a device 300. Device 300 may correspond to client device 210, data enrichment platform 220, and/or automation device 230. In some implementations, client device 210, data enrichment platform 220, and/or automation device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for processing data using automated techniques and crowdsourced techniques. In some implementations, one or more process blocks of FIG. 4 may be performed by data enrichment platform 220. In some implementations, one or more process blocks of FIG. 4 may be performed by another device or a group of devices separate from or including data enrichment platform 220, such as client device 210 and/or automation device 230.

As shown in FIG. 4, process 400 may include receiving data to be processed and information identifying tasks to be performed to process the data (block 410). For example, data enrichment platform 220 may receive data (e.g., first data) to be processed, and information identifying tasks to be performed to process the data. In some implementations, data enrichment platform 220 may receive the data from client device 210. For example, client device 210 may provide an image, a text string, an audio file, a video file, a data structure, a link to a data structure, or the like, to be processed. Additionally, or alternatively, data enrichment platform 220 may receive the data from another source, such as a server, a device that hosts a webpage, or the like (e.g., automatically, based on a request for the data by data enrichment platform 220, based on a push notification from client device 210, etc.). Additionally, or alternatively, data enrichment platform 220 may receive the data based on a user interaction (e.g., a user interaction with client device 210, a user interaction with data enrichment platform 220, a user interaction with a webpage, etc.).

The data may include unstructured and/or unprocessed information. For example, the data may include an image, to be processed by associating the image with tags, identifying information, or the like. As another example, the data may include an audio and/or video file, such as a song, a voice recording, a feed from a microphone, or the like. Data enrichment platform 220 may receive the audio and/or video file to process the audio and/or video file by associating the audio and/or video file with tags, interpretations of emotions conveyed by the audio and/or video file, or the like. As yet another example, the data may include a text file, such as a set of forum posts from a website. Data enrichment platform 220 may receive the text file to categorize the forum posts, to identify events, topics, people, products, services, etc. to which the forum posts relate, or the like. Other examples of data to be processed are possible, and the above examples are not intended to be comprehensive or exhaustive of possible examples.

In some implementations, the data may include a set of images provided by a user of client device 210. For example, the user may provide a set of images from a social media platform, a website, a camera associated with client device 210, or the like. In some implementations, the set of images may include objects to be identified. For example, the set of images may include articles of clothing, and the user may provide the set of images for data enrichment platform 220 to identify the articles of clothing. As another example, the set of images may include one or more persons, and the user may provide the set of images for data enrichment platform 220 to identify the one or more persons.

Data enrichment platform 220 may receive information identifying tasks to be performed to process the data. In some implementations, the tasks may relate to automated techniques. For example, in some cases, data enrichment platform 220 may use automated techniques, or may provide data for processing using automated techniques, to generate the processed data. In some implementations, the automated techniques may include predictive analytics, statistics, machine learning, data mining, pattern recognition techniques, Markov modeling techniques, trending techniques, segregation techniques, data sorting techniques, automated searching techniques, data formatting techniques, or the like.

Additionally, or alternatively, the tasks may relate to crowdsourcing techniques. For example, data enrichment platform 220 may use paid crowdsourcing techniques and/or free crowdsourcing techniques to generate the processed data. For example, data enrichment platform 220 may provide the data to a crowdsourcing platform, and may generate processed data based on information received from workers of the crowdsourcing platform. In some implementations, data enrichment platform 220 may use an application programming interface (API) to provide the data to the crowdsourcing platform and/or to receive responses from workers of the crowdsourcing platform.

As further shown in FIG. 4, process 400 may include selecting an automation/crowdsourcing approach to cause the tasks to be performed (block 420). For example, data enrichment platform 220 may select an automation/crowdsourcing approach to cause the tasks to be performed. An automation/crowdsourcing approach may include a combination of automated techniques for processing data and crowd-based techniques for processing data. The automation/crowdsourcing approach may identify which tasks, of the tasks associated with unprocessed data, are to be crowdsourced (e.g., performed by workers of crowds), and which tasks, of the tasks associated with the unprocessed data, are to be automated (e.g., performed by data enrichment platform 220 and/or automation device 230). In some implementations, data enrichment platform 220 may select one or more of an automation/crowdsourcing pipelining approach, a crowd verification approach, an automation model trained using crowdsourcing, or another type of approach, as described in more detail below.

In some implementations, data enrichment platform 220 may determine whether a task is suitable for performance by a crowd or by automation device 230. For example, to process unprocessed data, multiple tasks may need to be performed with regard to the unprocessed data. Some types of tasks may be more effectively performed by automation device 230 (e.g., data mining tasks, data structure searches, data manipulation tasks, etc.), and other types of tasks may be more effectively performed by workers of a crowd (e.g., tasks requiring human intuition, such as identifying similar outfits, indicating whether search results are reliable, checking accuracy of information identified by automation device 230, recognizing emotion in human voices, etc.). Data enrichment platform 220 may determine whether a task is suitable for performance by a crowd or by automation device 230 based on a task type of the task. For example, if a task type associated with a task involves performing an Internet search and tabulating results of the Internet search, data enrichment platform 220 may determine that the task is best performed by automation device 230. As another example, if a task type associated with a task involves determining whether a first clothing matches a second clothing item, data enrichment platform 220 may determine that the task is best performed by workers of a crowd.

Data enrichment platform 220 may determine a task type of a task based on information associated with the task. For example, data enrichment platform 220 may receive information identifying a set of tasks for processing unprocessed data, and may receive information indicating a particular task type associated with each task. Data enrichment platform 220 may store information identifying task types, and information identifying whether the task types are suitable for performance by a crowd or by automation device 230. For example, data enrichment platform 220 may store information identifying a cost (e.g., a monetary cost, a time cost, an expected accuracy, a cost in terms of resources needed, etc.) of performing a task of a certain task type using a crowd, and/or of performing the task of the certain task type using automation device 230. Data enrichment platform 220 may use the information identifying the cost to determine whether a task, of the certain task type, is to be performed by automation device 230 and/or a crowd (e.g. based on comparing a cost associated with performing the task using a crowd, and a cost associated with performing the task using automation device 230). In this way, data enrichment platform 220 assigns tasks to be performed by a crowd or by automation device 230 based on task types of the tasks, which conserves processor resources of automation device 230 and crowdsourcing resources.

In some implementations, data enrichment platform 220 may determine a particular amount to pay members of a crowd to perform a task. For example, data enrichment platform 220 may provide a task to a crowd, and may submit a reward (e.g., a financial payment, a discount, a credit, or the like) to members of the crowd that complete the task. In some cases, a task that is associated with a higher reward may tend to be completed more quickly and/or more accurately than a task that is associated with a lower reward. Data enrichment platform 220 may determine a reward to give workers of a crowd that complete a task, and may provide the task to the crowd. Based on a result of providing the task to the crowd, data enrichment platform 220 may increase or decrease the reward. For example, if data enrichment platform 220 determines that an accuracy associated with the results does not satisfy an accuracy threshold, data enrichment platform 220 may increase the reward. As another example, if data enrichment platform 220 determines that the crowd completes the task more quickly than expected, data enrichment platform 220 may decrease the reward. In this way, data enrichment platform 220 configures a reward based on crowd performance, which saves time and money used to crowdsource tasks.

In some implementations, data enrichment platform 220 may receive input identifying an automation/crowdsourcing approach for processing data. For example, data enrichment platform 220 may provide a user interface that permits a user to identify tasks to perform, to specify an order in which the tasks are to be performed, to specify whether the tasks are to be performed by a crowd and/or by automation device 230, to specify a particular crowd to perform a task, to specify a particular automation/crowdsourcing approach for processing data, or the like. In some implementations, the user interface may permit a user to specify an amount of reward to give workers of a crowd who perform a task. In this way, data enrichment platform 220 conserves processor resources that may otherwise be used to determine an automation/crowdsourcing approach to use.

As further shown in FIG. 4, process 400 may include using an automation/crowdsourcing pipelining approach to generate processed data (block 430). For example, data enrichment platform 220 may use an automation/crowdsourcing pipelining approach to generate the processed data. To perform the automation/crowdsourcing pipelining approach, data enrichment platform 220 may identify a set of tasks to be performed by one or more crowds and automation device 230 to generate the processed data.

Data enrichment platform 220 may assign the set of tasks for performance (e.g., by a crowd and/or automation device 230) automatically, in some implementations. For example, data enrichment platform 220 may determine which tasks are likely to be performed more efficiently by an automated technique, and which tasks are likely to be performed more efficiently by a crowdsourced technique (e.g., based on task types of the tasks, based on costs associated with performing the tasks, based on availability of crowds and/or automation device 230, etc.). As another example, assume that a first task and a second task are to be performed simultaneously. Data enrichment platform 220 may assign the first task to be performed by an automated service, and may assign the second task to be performed by a crowd (e.g., based on the automated service being assigned to the first task). For a more detailed description and an example of an automation/crowdsourcing pipelining approach refer to FIGS. 5A-5H, below.

As further shown in FIG. 4, process 400 may include using a crowd verification approach to generate processed data (block 440). For example, data enrichment platform 220 may use a crowd verification approach to generate the processed data. In some implementations, data enrichment platform 220 may provide unprocessed data to automation device 230 for processing. Automation device 230 may process the data, and may provide the processed data to one or more crowds (e.g., via data enrichment platform 220) for verification. The one or more crowds may verify the processed data, for example, by checking whether the processing operations performed by automation device 230 are accurate, correct, complete, or the like.

In some implementations, data enrichment platform 220 may provide one or more rules, an automation model, a machine learning algorithm, or the like, for use by automation device 230 to process the data. Additionally, or alternatively, automation device 230 may train a machine learning algorithm, an automation model, a predictive model, or the like, to process the data. Additionally, or alternatively, automation device 230 may process the data based on an automation model generated and/or trained by a crowd, as described in more detail below. In some implementations, automation device 230 may process the data by providing the data to a search engine (e.g., an Internet search engine, a product database search engine, etc.), and may provide processed data including the unprocessed data and/or search results returned by the search engine.

For example, assume that a first task involves identifying a region of an automobile that is damaged in an automobile accident. Data enrichment platform 220 may receive unprocessed data (e.g., images of damaged automobiles) and information identifying the first task. Data enrichment platform 220 may cause automation device 230 to perform the first task (e.g., based on an automation model, based on a set of rules, etc.), and may receive processed data from automation device 230 identifying damaged regions of automobiles shown in the unprocessed data. Data enrichment platform 220 may provide the processed data and the unprocessed data to a crowd. Workers of the crowd may provide feedback information indicating whether automation device 230 correctly performed the first task (e.g., by indicating whether automation device 230 identified the correct regions of damaged automobiles). In some implementations, data enrichment platform 220 may improve performance of the first task by automation device 230 based on the feedback information (e.g., may modify parameters of an automation model, a set of rules, etc.). In this way, data enrichment platform 220 improves performance of automation device 230, and conserves processor resources of automation device 230 and crowdsourcing resources.

As further shown in FIG. 4, process 400 may include training an automation model using crowdsourcing to generate processed data (block 450). For example, data enrichment platform 220 may provide unprocessed data to a crowd, and may provide information identifying tasks for the crowd to perform to process the unprocessed data. The crowd may perform the tasks to process the data, and may provide processed data to data enrichment platform 220. Data enrichment platform 220 may train or update an automation model based on the unprocessed data and the corresponding processed data. Data enrichment platform 220 may provide the automation model to automation device 230, and automation device 230 may process additional unprocessed data based on the automation model (e.g., the same unprocessed data, different unprocessed data, etc.). In this way, data enrichment platform 220 conserves processor resources of data enrichment platform 220 and crowdsourcing resources.

To generate the automation model, data enrichment platform 220 may determine rules that relate known inputs (e.g., unprocessed data to be processed by one or more crowds) to known outputs (e.g., processed data that is generated based on the unprocessed data by workers of the one or more crowds). Data enrichment platform 220 may generate the automation model based on the rules, and may provide information identifying the automation model (e.g., the rules) to automation device 230. Automation device 230 may input unprocessed data to the automation model, and may provide an output of the automation model (e.g., processed data) to data enrichment platform 220.

In some implementations, data enrichment platform 220 may train the automation model. For example, data enrichment platform 220 may generate the automation model, may provide the automation model to automation device 230, and may receive processed information from automation device 230 based on the automation model. Data enrichment platform 220 may train the automation model based on the processed information. For example, data enrichment platform 220 may modify parameters relating to the relationship between unprocessed data and processed data, to improve accuracy of the automation model.

As another example, data enrichment platform 220 may receive processed information from automation device 230 that is generated based on particular unprocessed information. Data enrichment platform 220 may provide the particular unprocessed information to one or more crowds to obtain processed information, and may compare the processed information generated by the one or more crowds to the processed information generated by automation device 230. Data enrichment platform 220 may train the automation model based on a difference between the processed information from the one or more crowds and the processed information from automation device 230. In this way, data enrichment platform 220 trains the automation model, which improves accuracy of the processed data and reduces processor and/or storage usage of automation device 230.

As further shown in FIG. 4, process 400 may include providing the processed data (block 460). For example, data enrichment platform 220 may provide the processed data. In some implementations, data enrichment platform 220 may provide the processed data to client device 210. For example, data enrichment platform 220 may provide information identifying relevant products, classified text, tagged images, or the like, to client device 210. In some implementations, data enrichment platform 220 may provide the processed data to another device. For example, data enrichment platform 220 may provide the processed data to a server device (e.g., for storage, etc.). In some implementations, data enrichment platform 220 may provide the processed data for display (e.g., by client device 210, by data enrichment platform 220, etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5H are diagrams of an example implementation 500 relating to example process 400 shown in FIG. 4. FIGS. 5A-5H show an example of processing data using automated techniques and crowdsourced techniques.

Figure 5A:
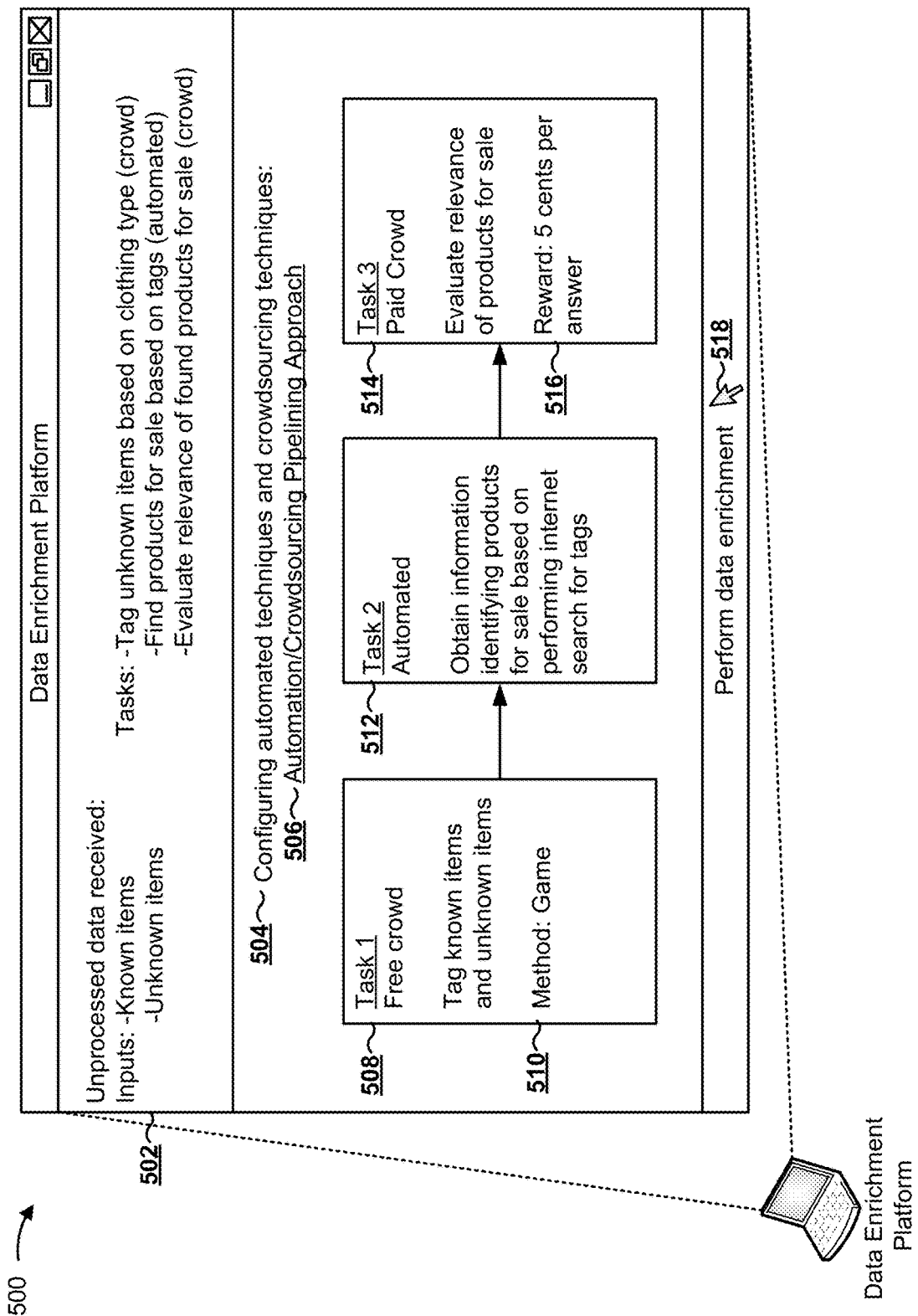
FIGS. 5A-5H are diagrams of an example implementation relating to the example process shown in FIG. 4.

As shown in FIG. 5A, and by reference number 502, data enrichment platform 220 may receive unprocessed data. As further shown, the unprocessed data may include inputs to be processed. Here, the inputs include known items and unknown items. The known items include images of clothing and tags associated with the images of clothing, as described in more detail below. The unknown items include images of clothing that are not associated with tags, as is also described in more detail below.

As further shown, the unprocessed data may identify tasks to perform to process the data. Here, the unprocessed data identifies three tasks: a first task to provide tags to be associated with the unknown items based on a clothing type shown in the images (e.g., to be performed by a crowd), a second task to find products for sale based on the tags associated with the unknown images (e.g., to be performed using an automated technique), and a third task to evaluate a relevance of the found products for sale to the unknown items (e.g., to be performed by a crowd).

As shown by reference number 504, data enrichment platform 220 may configure automated techniques and crowdsourcing techniques to perform the three tasks. For example, data enrichment platform 220 may select an automation/crowdsourcing approach based on the three tasks (e.g., based on an order in which the tasks are to be performed, based on which of the tasks are to be performed automatically and which of the tasks are to be performed by crowds, based on costs associated with performing the tasks automatically and/or using a crowd, etc.). As shown by reference number 506, data enrichment platform 220 determines to use an automation/crowdsourcing pipelining approach to perform the three tasks. For example, data enrichment platform 220 may determine that the second task requires an input from the first task, may determine that the third task requires an input from the second task, and may thereby determine that the tasks are to be assigned (e.g., to crowds and/or automation device 230) based on an automation/crowdsourcing pipelining approach.

As shown by reference number 508, data enrichment platform 220 may determine that the first task (e.g., tagging the unknown items and the known items) is to be provided to a free crowd. The free crowd may tag the unknown items based on clothing items shown in the images of the unknown items. In some implementations, the free crowd may tag the known items to permit data enrichment platform 220 to verify accuracy of tags provided by the free crowd for the unknown items, as described in more detail below. As shown by reference number 510, to improve participation of workers of the free crowd, data enrichment platform 220 may provide a game that is configured to facilitate assignment of tags for the unknown items and the known items, as described in more detail below.

As shown by reference number 512, data enrichment platform 220 may select automation device 230 to perform the second task (e.g., obtaining information identifying products for sale based on performing an Internet search for the tags associated with the unknown items). Data enrichment platform 220 may select automation device 230 to perform the second task based on the information indicating that the second task is to be automated. Additionally, or alternatively, data enrichment platform 220 may determine that the second task can be automated (e.g., based on a task type associated with the second task and/or based on the second task involving performing an Internet search, a database search, a data mining operation, etc.), and may select automation device 230 to perform the second task based on determining that the second task can be automated.

As shown by reference number 514, data enrichment platform 220 may determine that the third task (e.g., identifying relevant products for sale, of the products found by automation device 230) is to be performed by a paid crowd. For example, data enrichment platform 220 may determine that the third task is to be performed by a paid crowd based on a task type (e.g., based on the task requiring evaluation of relevance of a product), based on the information identifying the third task, or the like. In some implementations, data enrichment platform 220 may receive a user interaction indicating to provide the third task to the paid crowd.

As shown by reference number 516, data enrichment platform 220 may determine a reward for workers, of the paid crowd, who contribute to performance of the third task. For example, data enrichment platform 220 may determine the reward based on an urgency of the third task, based on past performance information associated with workers of the paid crowd, based on a budget for the third task, or the like. As shown by reference number 518, data enrichment platform 220 may receive an interaction (e.g., with a user interface of data enrichment platform 220 or another device) to cause data enrichment platform 220 to perform data enrichment on the unprocessed data (e.g., to cause the free crowd, automation device 230, and the paid crowd to perform the three respective tasks).

Figure 5B:
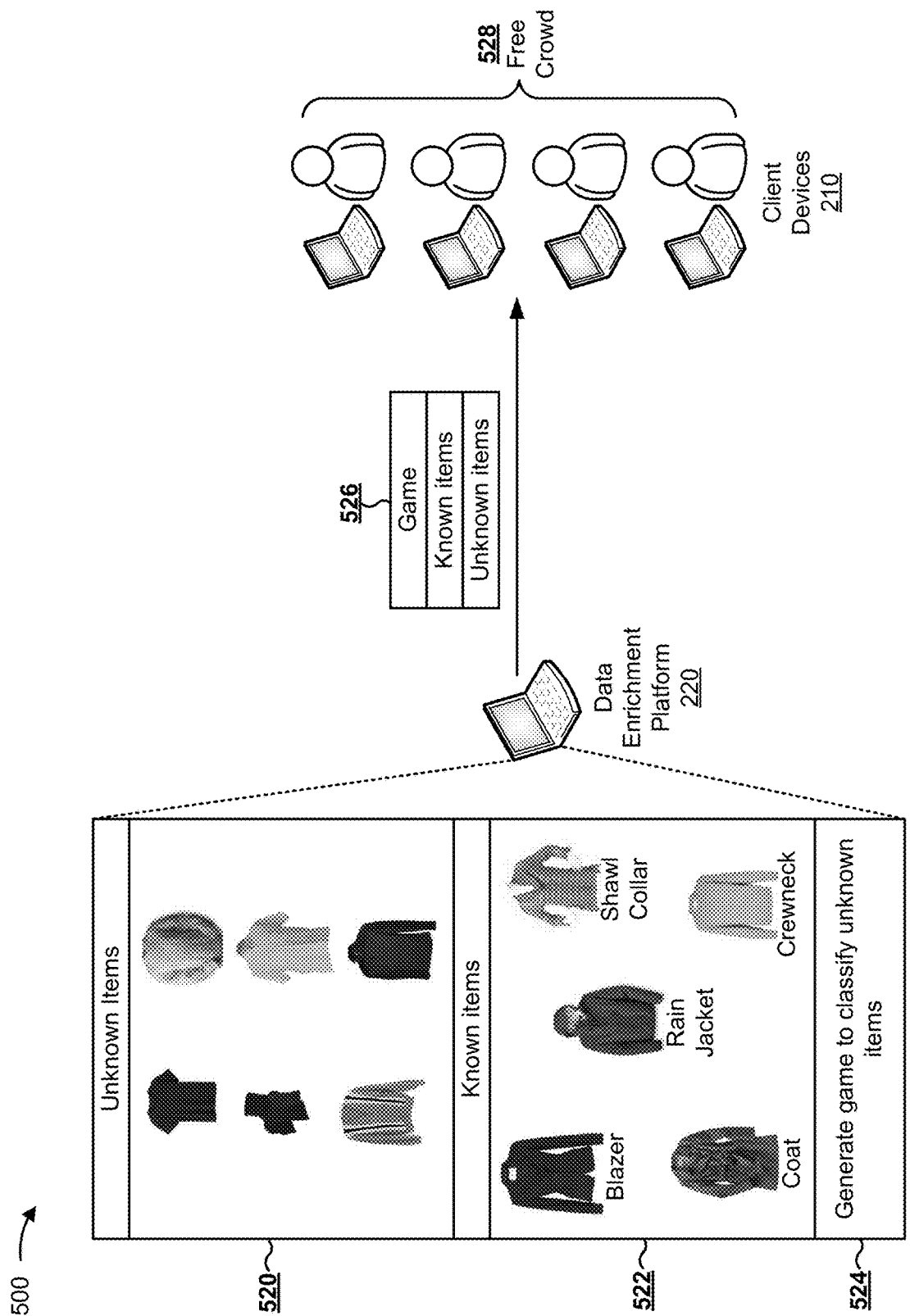

As shown in FIG. 5B, and by reference number 520, the information identifying the unknown items may include images of clothing items. As shown by reference number 522, the information identifying the known items may include images of clothing items. As further shown, the known items may be associated with tags (e.g., blazer, shawl collar, rain jacket, crewneck, and coat). Assume that the tags are known to be correct. Based on the tags associated with the known items, data enrichment platform 220 may verify accuracy of tags assigned to the unknown items by the free crowd, as described in more detail below.

As shown by reference number 524, data enrichment platform 220 may generate and/or provide a game to process the data. For example, data enrichment platform 220 may provide a game to workers of the free platform. The game may facilitate interaction by the workers to process the data. For example, the game may present images of the unknown items and the known items to the workers, and may permit the workers to assign tags to the clothing items shown in the images, as described in more detail below. As shown by reference number 526, data enrichment platform 220 may provide information identifying the game, the known items, and the unknown items to client devices 210. As shown by reference number 528, client devices 210 may be associated with the workers of the free crowd.

Figure 5C:
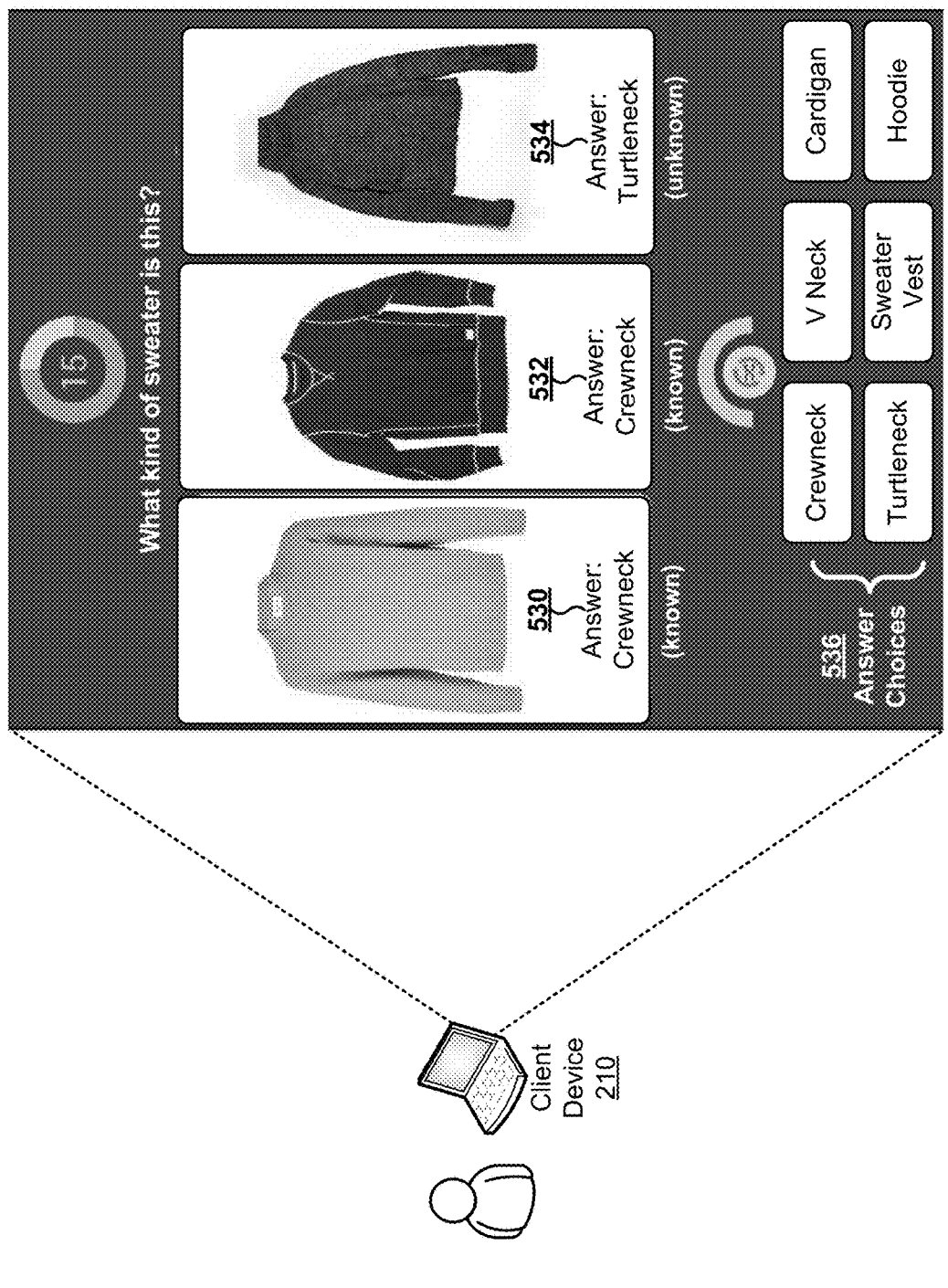

As shown in FIG. 5C, client device 210 may provide the game to a worker. In some implementations, the worker may process the data (e.g., the unknown items) by answering questions regarding the data. For example, client device 210 may provide, to the worker, images with one or more questions regarding aspects of the image. The workers may answer the questions based on the image. Here, the question is "What kind of sweater is this?" As shown by reference number 530, the worker may provide an answer of "crewneck" for a first item. As further shown, the first item is a known item (e.g., associated with a tag that is known to be correct). As shown by reference number 532, the worker may provide an answer of "crewneck" for a second item. As further shown, the second item is a known item.

As shown by reference number 534, the worker may provide an answer of "turtleneck" for a third item. As further shown, the third item is an unknown item. Data enrichment platform 220 may determine whether responses from the worker are reliable (e.g., correct, likely to be correct, etc.) based on responses by the worker with regard to known items. For example, data enrichment platform 220 may determine whether a worker provides an expected response for a known item, and may determine whether a set of responses from the worker are reliable based on whether the worker provides the expected response, as described in more detail in connection with FIG. 5D, below. In some implementations, client device 210 may not provide information to the worker identifying which items are known items, and which items are unknown items. In this way, client device 210 reduces a likelihood that the worker expends decreased effort when providing responses for unknown items.

As shown by reference number 536, the game may provide answer choices, from which the worker may select a response for each item. In this way, data enrichment platform 220 conserves processor resources of client device 210 by reducing a variety of responses for client device 210 to receive and process, and improves accuracy of performance of the first task.

Figure 5D:
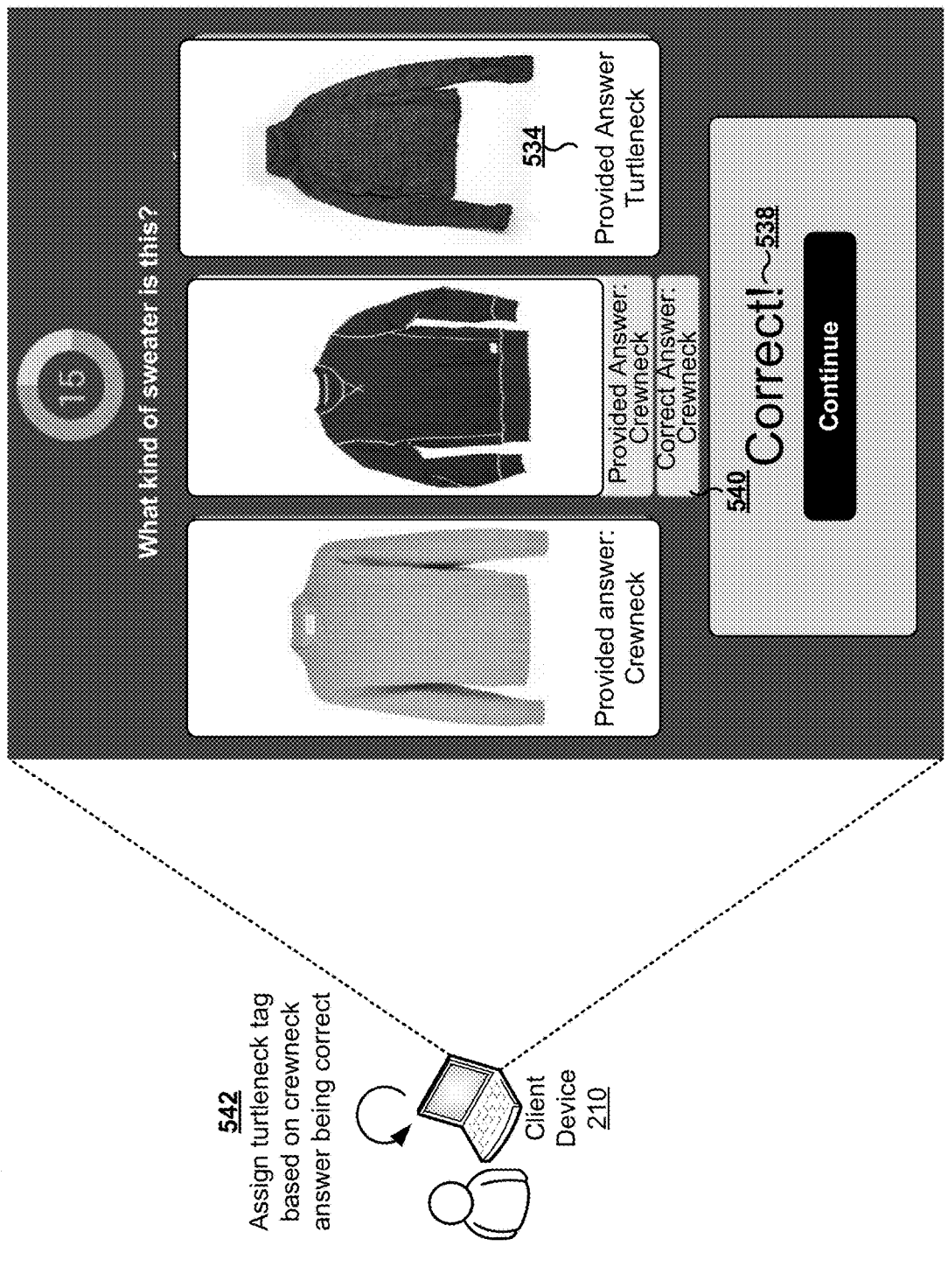

As shown in FIG. 5D, and by reference number 538, client device 210 may provide information indicating that the responses provided by the worker are correct. As shown by reference number 540, to determine whether a response provided by the worker is correct, client device 210 may compare a tag associated with a known item to a response provided by the worker. When the tag matches the known response, client device 210 may provide the information indicating that the responses are correct. When the tag does not match the known response, client device 210 may provide information indicating that the responses are incorrect, as described in more detail below.

As shown by reference number 542, client device 210 may assign a tag of "turtleneck" to the unknown item (e.g., as shown by reference number 534). Client device 210 may assign the tag to the unknown item based on the response from the worker matching the tag associated with the known item. In this way, client device 210 classifies an unknown item based on responses from workers, which conserves processing power of data enrichment platform 220 and/or automation device 230 that may otherwise be used to tag the item.

Figure 5E:
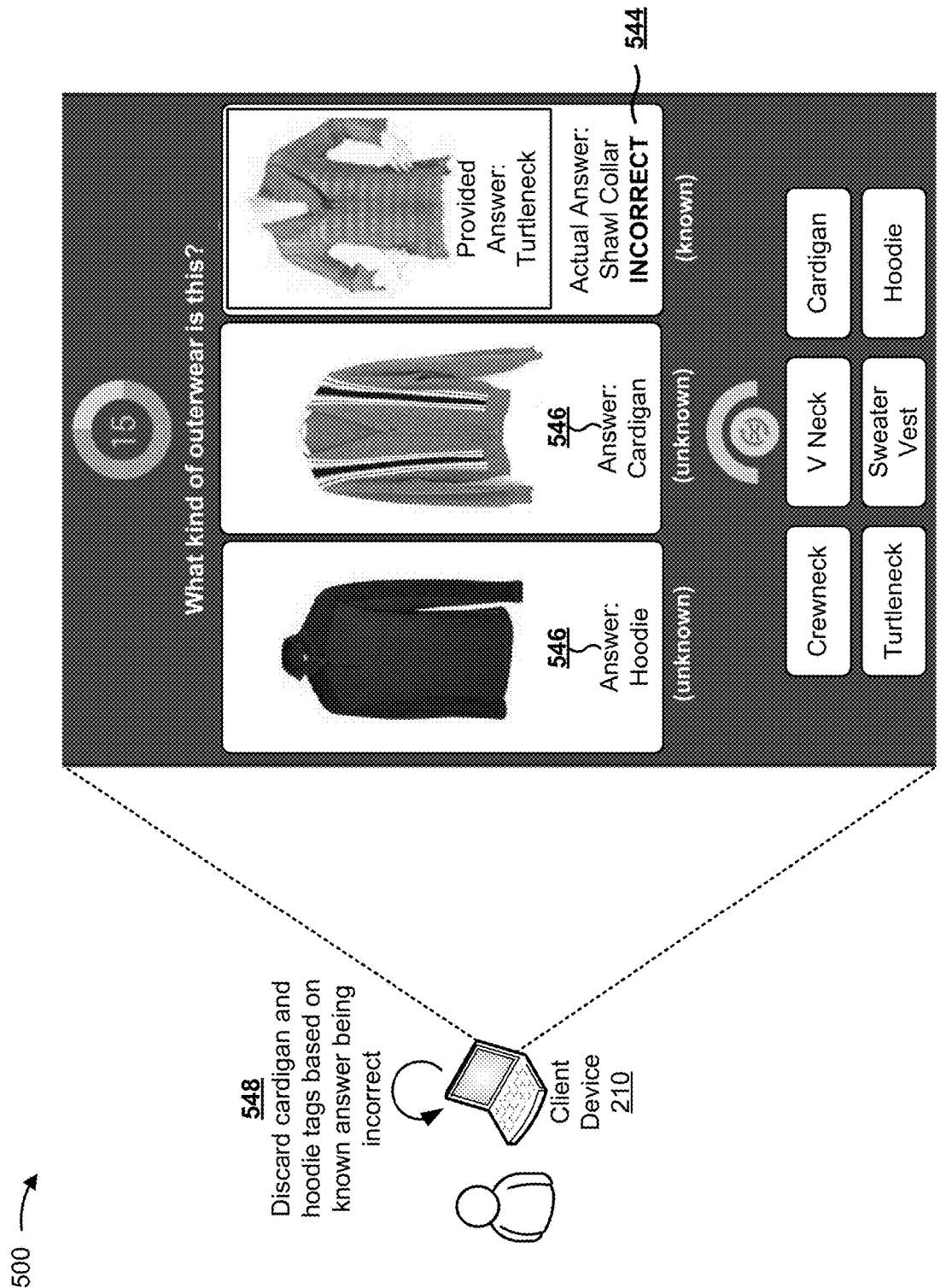

For the purpose of FIG. 5E, assume that client device 210 provides another set of items to a worker for tagging, and assume that the worker provides responses to tag each item, of the set of items. As shown in FIG. 5E, and by reference number 544, client device 210 may provide information indicating that a response from the worker is incorrect. For example, client device 210 may select a response corresponding to a known item, from the three responses provided by the worker, and may compare the selected response to a tag associated with the known item. In some cases, as in this case, the response may not match the tag. In such cases, client device 210 may determine that responses provided by the worker are unreliable with regard to the other set of items. As shown by reference number 546, unknown items in this case may be associated with responses of "zippered" and "cardigan." As shown by reference number 548, client device 210 may discard the responses associated with the unknown items based on the response associated with the known item not matching the tag. In this way, client device 210 automatically determines whether responses provided by the worker are reliable, which improves accuracy of the processed data, conserves time and money for a company implementing data enrichment platform 220, and conserves processor resources of data enrichment platform 220 and/or automation device 230.

In some implementations, data enrichment platform 220 may determine whether to use responses from a particular worker based on past performance information associated with the particular worker and/or past performance information associated with other workers. For example, data enrichment platform 220 may require the particular worker to be associated with a score that satisfies a threshold (e.g., 80% correct responses, 90% correct responses, 80% correct response in a particular game, etc.). Additionally, or alternatively, data enrichment platform 220 may determine that a particular response, from multiple workers, is to be used (e.g., based on receiving the particular response from a highest-scoring worker of the multiple workers, based on receiving the particular response from a majority of the multiple workers, based on receiving the particular response from a threshold quantity and/or ratio of the workers, based on receiving the particular response from all of the multiple workers, based on receiving the particular response from a highest-scoring subset of the multiple workers, etc.).

In some implementations, data enrichment platform 220 may obtain expected responses from workers of a paid crowdsourcing platform, and may use the expected responses to evaluate responses from workers of a free crowdsourcing platform. In this way, data enrichment platform 220 improves reliability of the free crowdsourcing platform by using the paid crowdsourcing platform, which saves time and money that is otherwise used by an administrator of data enrichment platform 220 to determine the expected responses.

In some implementations, a first worker may provide a question for other workers to answer. For example, data enrichment platform 220 may provide an interface that presents a variety of questions for workers to answer regarding data to be processed. The interface may permit a worker to provide a question regarding the data. For example, if the data includes an image of a person, a worker may provide a question such as "what is this person's mood?" Data enrichment platform 220 may present the question, with the image of the person, to other workers for the other workers to answer. In this way, data enrichment platform 220 permits crowdsourced workers to specify questions to process data, which reduces processor requirements for data enrichment platform 220 to process the data.

In some implementations, data enrichment platform 220 may track performance information for workers. For example, when a particular worker provides reliable data (e.g., based on a known prompt, as described above), data enrichment platform 220 may increment a score associated with the particular worker. Data enrichment platform 220 may track scores and/or information relating to scores for workers and/or crowdsourcing platforms. In some implementations, data enrichment platform 220 may determine particular types of tasks for which a worker/crowdsourcing platform has obtained a threshold score (e.g., a score that is better than an average score, a highest score, etc.), and may provide data to be processed to the worker/crowdsourcing platform based on the particular types of tasks.

In some implementations, workers may be associated with accounts. For example, when data enrichment platform 220 provides a game to workers, the workers may access the game based on accounts corresponding to the workers. Data enrichment platform 220 may track performance by the workers based on the corresponding accounts, and may display performance information to the workers. For example, data enrichment platform 220 may provide a worker's own performance information to the worker (e.g., as an incentive for the worker to improve performance), may provide the worker's performance information to other workers (e.g., as an incentive to outperform other workers), or the like. In some implementations, the account may be associated with a username, a login credential (e.g., a password, etc.), a profile (e.g., identifying a location, interests, data to provide to the worker for enrichment, performance information, etc.), or other information.

In some implementations, data enrichment platform 220 may select workers to perform a crowdsourcing task based on past performance information associated with the workers. For example, data enrichment platform 220 may select a quantity of workers to which to offer the data, may select a particular crowdsourcing platform to which to offer the data, may select a type of worker to process the data (e.g., free workers, paid workers, workers with a particular expertise, etc.), or the like. In some implementations, data enrichment platform 220 may select the workers based on profiles associated with the workers. For example, data enrichment platform 220 may select the workers based on the workers expressing interest in the crowdsourcing task, based on the workers historically satisfying a threshold performance level with regard to the crowdsourcing task, based on the workers historically satisfying a threshold performance level with regard to other crowdsourcing tasks, based on the workers being associated with a highest score, etc.).

In some implementations, data enrichment platform 220 may determine an amount to pay for workers of a paid crowdsourcing platform to process the data. For example, data enrichment platform 220 may use past performance of the workers on tasks associated with particular rewards to determine a reward that is likely to induce one or more workers to process data. Additionally, or alternatively, data enrichment platform 220 may determine an urgency associated with the data to be processed. In such a case, data enrichment platform 220 may offer a higher reward for a task that is more urgent than for a task that is less urgent which may induce workers to process the data more quickly. In some implementations, data enrichment platform 220 may offer a lower reward for a task that is less urgent than for a task that is more urgent, which conserves money.

Figure 5F:
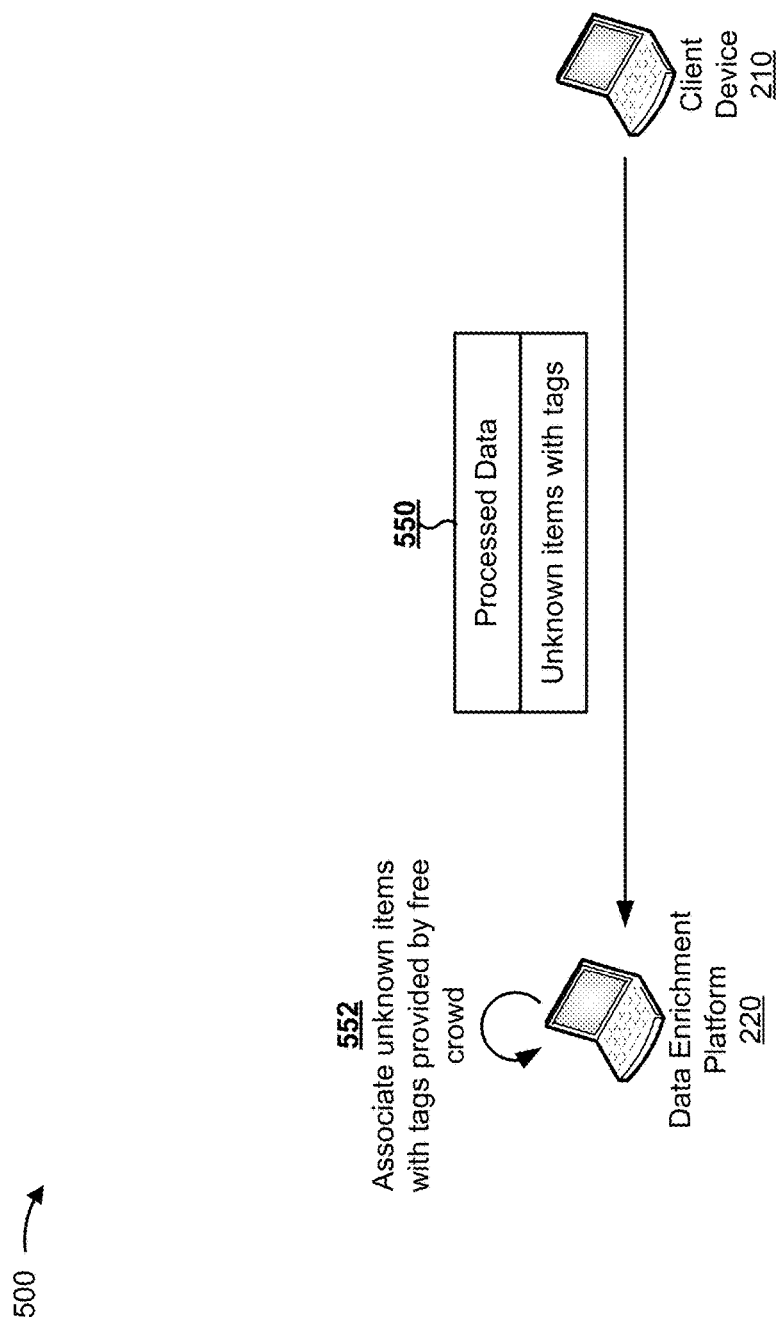

As shown in FIG. 5F, and by reference number 550, client device 210 may provide the processed data (e.g., the tags associated with the unknown items based on the responses) to data enrichment platform 220. As shown by reference number 552, data enrichment platform 220 may associate the unknown items with the tags provided by the workers of the free crowd. In some implementations, data enrichment platform 220 may process the responses. For example, data enrichment platform 220 may select a response for a particular unknown item based on a threshold (e.g., a threshold quantity of workers providing the response, a threshold ratio of workers providing the response, etc.), based on a worker that provides the response being considered reliable based on past performance information, or the like.

Figure 5G:
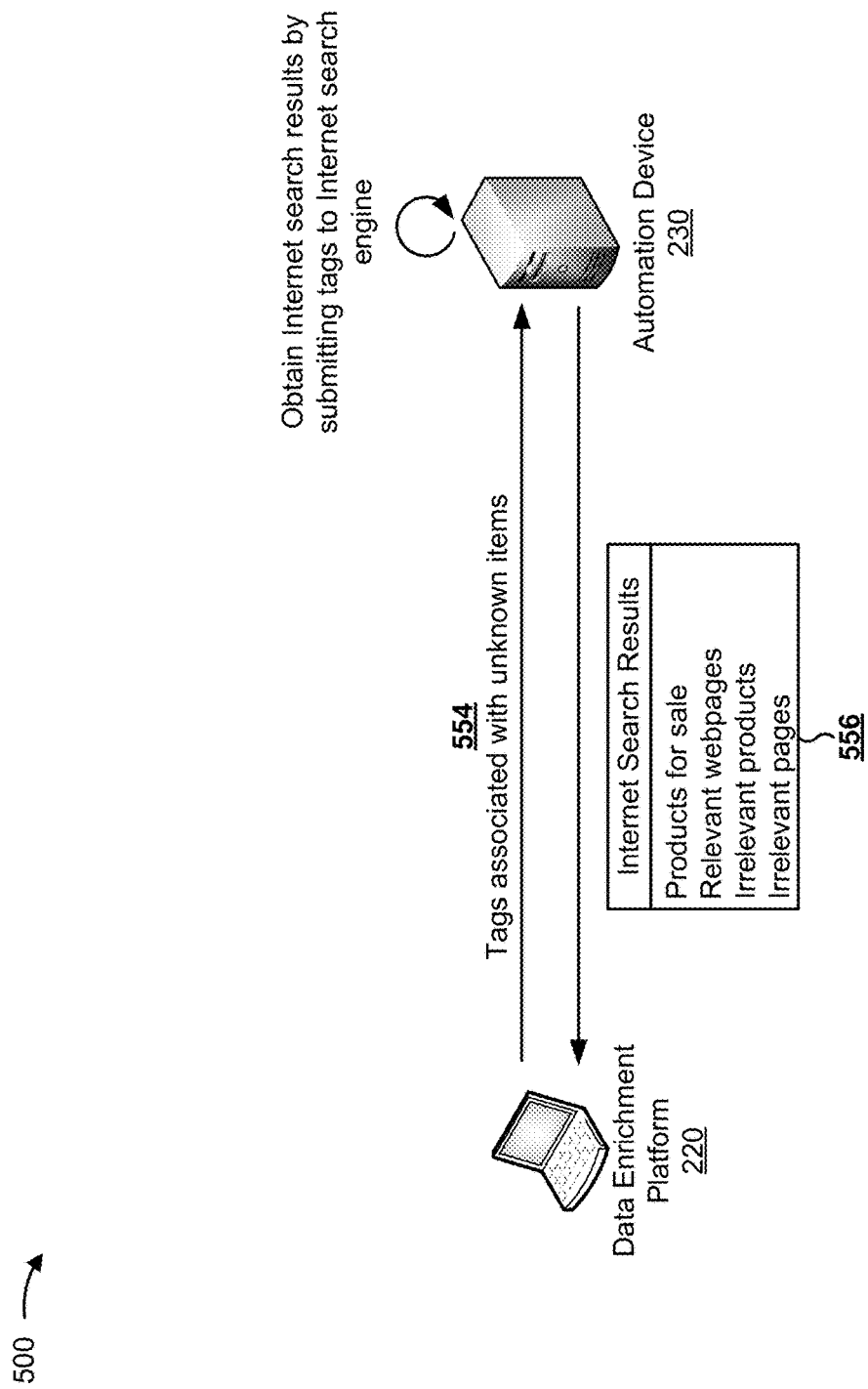

As shown in FIG. 5G, and by reference number 554, data enrichment platform 220 may provide the tags associated with the processed data (e.g., the tagged unknown items) to automation device 230. As further shown, automation device 230 may perform the second task by obtaining Internet search results based on the tags associated with the unknown items. In some implementations, data enrichment platform 220 may provide the tags associated with the unknown items to automation device 230 automatically (e.g., without user input). In this way, data enrichment platform 220 automatically obtains Internet search results for products to offer for sale based on an automation/crowdsourcing pipelining approach, which conserves processor resources of data enrichment platform 220 and time and/or money that may be used to crowdsource the identification of products to offer for sale.

In some implementations, automation device 230 may search a data structure that identifies products/services. For example, automation device 230 may search a particular company's database for products and/or services to offer for sale. In some implementations, data enrichment platform 220 and/or automation device 230 may determine a particular data structure (e.g., database, product catalog, etc.) to search. For example, the processed data may identify a particular type of product, and automation device 230 may identify a database that stores information regarding the particular type of product.

In some implementations, data enrichment platform 220 and/or automation device 230 may cause a search to be performed for variations on processed data. For example, assume that processed data includes the tag "men's jacket." In that case, automation device 230 may search for variations on the tag, such as "male jacket," "men's coat," "man's jacket," or the like. As another example, automation device 230 may cause a search to be performed for a text string of processed data, and may subsequently cause another search to be performed based on search results for the text string. For example, automation device 230 may search for related terms, may identify a database to search based on the search for the text string, or the like. In some implementations, automation device 230 may determine the variations automatically (e.g., without user input, based on one or more rules for determining the variations, etc.). Additionally, or alternatively, automation device 230 may provide the processed data to a crowdsourcing platform, and the crowdsourcing platform may provide the variations based on input from crowd workers.

As shown by reference number 556, automation device 230 may provide Internet search results based on the tags associated with the processed data. As further shown, the Internet search results may include relevant products for sale (e.g., from online retailers), relevant webpages, irrelevant products for sale, and/or irrelevant webpages. For example, the relevant products for sale may more closely resemble the clothing shown in the unknown items than the irrelevant products for sale. In this way, automation device 230 obtains Internet search results automatically, and provides the Internet search results for processing by a crowd that can evaluate relevance of the Internet search results, which conserves processor resources of automation device 230 and conserves resources that may otherwise be used to pay the crowd to obtain the Internet search results.

Figure 5H:
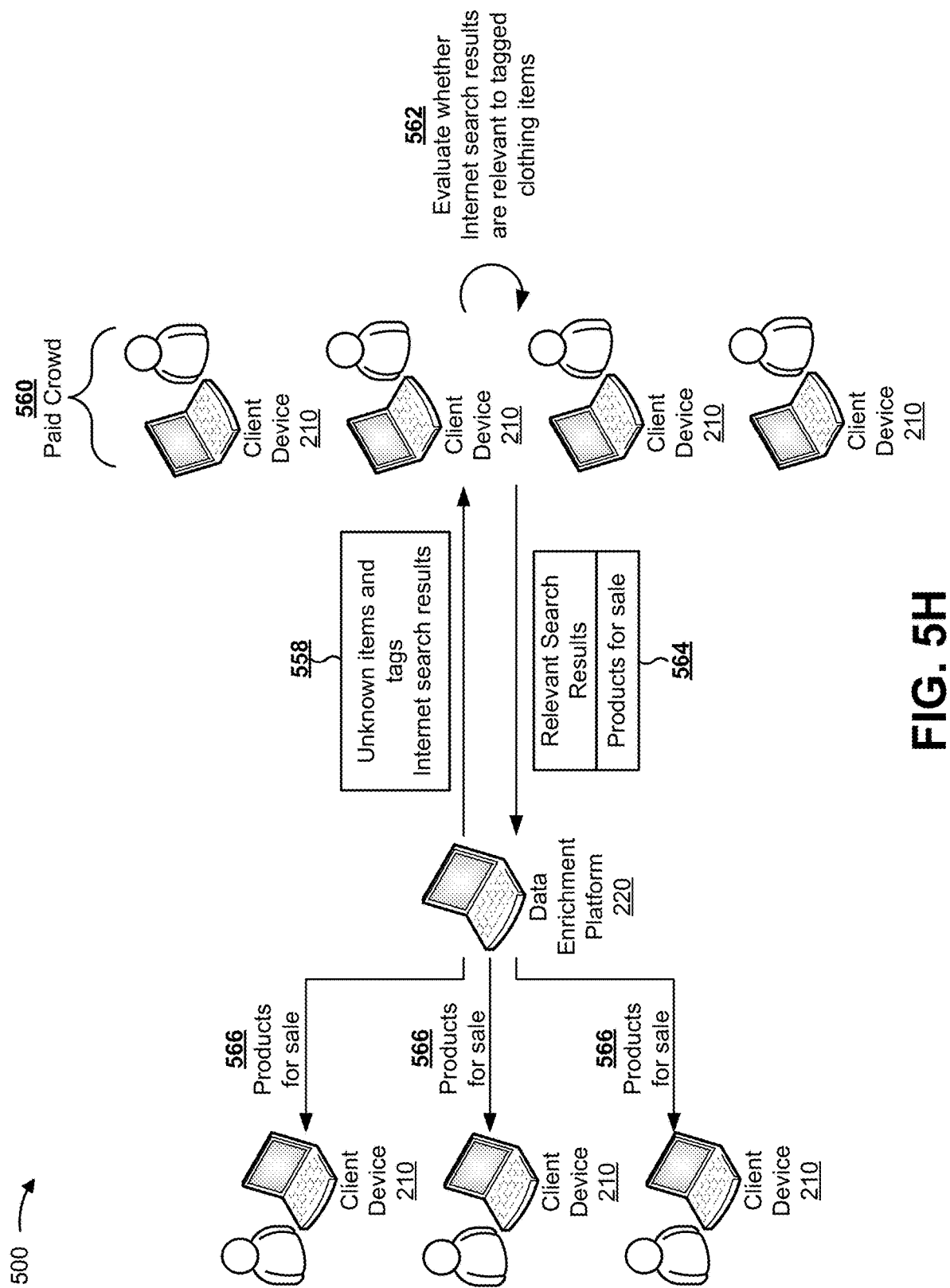

As shown in FIG. 5H, and by reference number 558, data enrichment platform 220 may provide the Internet search results to client devices 210. As shown by reference number 560, the client devices 210 may be associated with workers of a paid crowd. In some implementations, data enrichment platform 220 may automatically select a subset of the search results to provide to the workers of the paid crowd. For example, data enrichment platform 220 may select a subset of the search results that identify products, a subset of the search results that identify products that satisfy a price threshold, or the like. As shown by reference number 562, the workers may process the Internet search results by evaluating the Internet search results as identifying relevant products for sale, relevant webpages, irrelevant products for sale, and/or irrelevant webpages. In some implementations, data enrichment platform 220 may provide web links that identify the products to paid workers, and the paid workers may flag web links that identify relevant products. In some implementations, data enrichment platform 220 may provide a results list from a search engine, and the paid workers may select the relevant products/services from the results list.

A relevant product, for the purpose of FIGS. 5A-5H, may include a product that is selected from the search results based on possessing a particular attribute. Data enrichment platform 220 and/or the paid crowd may select the relevant products, for example, based on a likelihood for a consumer to purchase the relevant products, based on the relevant products matching products or services included in input (unprocessed) data, based on the relevant products satisfying a criterion (e.g., a cost criterion, an availability criterion, a delivery speed criterion, etc.), or the like. As shown by reference number 564, the paid workers may provide information identifying relevant search results, including relevant products to offer for sale.

As shown by reference number 566, data enrichment platform 220 may offer the relevant products to users associated with client devices 210. For example, assume that data enrichment platform 220 received an image of a cardigan from a particular client device 210. Data enrichment platform 220 may provide a relevant product that matches the cardigan to the particular client device 210.

In this way, data enrichment platform 220 identifies products for sale that match input images using an automation/crowdsourcing pipelining approach. By using the automation/crowdsourcing pipelining approach, data enrichment platform 220 assigns tasks that are predicted to be more efficiently performed by automation to be performed automatically, and assigns tasks that are predicted to be more efficiently performed by crowds to be performed by crowds. Thereby, data enrichment platform 220 conserves processor resources of client device 210, data enrichment platform 220, and/or automation device 230, and saves time and money for an organization that implements the automation/crowdsourcing pipelining approach.

As indicated above, FIGS. 5A-5H are provided merely as an example. Other examples are possible and may differ from what was described with regard to FIGS. 5A-5H.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive first data to be processed;
receive information identifying a plurality of tasks to be performed to process the first data;
compare a first cost, associated with causing one or more first tasks, of the plurality of tasks, to be performed by an automation device, and a second cost associated with causing the one or more first tasks to be performed using a crowdsourcing platform;
determine, based on the information identifying the plurality of tasks and comparing the first cost and the second cost, that a first portion of the one or more first tasks are to be performed by the automation device, that a second portion of the one or more first tasks are to be performed by a first crowd associated with the crowdsourcing platform, and that a third portion of the one or more first tasks are to be performed by a second crowd associated with the crowdsourcing platform;
receive input specifying an order in which the plurality of tasks are to be performed by each of the automation device, the first crowd, and the second crowd;
provide, to the automation device and to the crowdsourcing platform, the first data;
cause, based on the order, the automation device to perform the first portion of the one or more first tasks and the first crowd to perform the second portion of the one or more first tasks and the second crowd to perform the third portion of the one or more first tasks;
receive, from the automation device and the crowdsourcing platform, second data,
the second data being generated based on the automation device performing the first portion of the one or more first tasks and based on the first crowd performing the second portion of the one or more first tasks and the second crowd performing the third portion of the one or more first tasks;
compare the second data to expected data to determine that at least one of the first crowd or the second crowd correctly performed the second portion of the one or more first tasks or the third portion of the one or more first tasks;
generate, based on a relationship between the first data and the second data and based on determining that the at least one of the first crowd or the second crowd correctly performed the second portion of the one or more first tasks or the third portion of the one or more first tasks, an automation model,
wherein the one or more processors, when generating the automation model, are to:
modify parameters, relating to the relationship between the first data and the second data, for processing, via the automation model, at least one of the second portion of the one or more first tasks or the third portion of the one or more first tasks, and
train a machine learning model, based on the modified parameters, as the automation model; and
provide the automation model to the automation device,
the automation model causing the automation device to perform the at least one of the second portion of the one or more first tasks or the third portion of the one or more first tasks.

2. The device of claim 1, where the one or more processors, when determining that the second portion of the one or more first tasks are to be performed by the first crowd and that the third portion of the one or more first tasks are to be performed by the second crowd, are to:
- determine, based on the information identifying the plurality of tasks, that the second portion of the one or more first tasks and the third portion of the one or more first tasks are associated with a particular task type; and
- determine, based on information indicating that tasks of the particular task type are to be crowdsourced, that the second portion of the one or more first tasks and the third portion of the one or more first tasks are to be performed by the first crowd and the second crowd.

3. The device of claim 1, where the one or more processors, when determining that the second portion of the one or more first tasks are to be performed by the first crowd and that the third portion of the one or more first tasks are to be performed by the second crowd, are to:
- determine a reward to be provided to the first crowd and the second crowd based on past performance of the first crowd and the second crowd, or based on an urgency associated with the first portion of the one or more first tasks or the second portion of the one or more first tasks.

4. The device of claim 3, where the one or more processors, when receiving the second data, are to:
- cause the reward to be provided to the first crowd and the second crowd based on receiving the second data.

5. The device of claim 1, where the one or more processors are to:
- store performance information indicating whether the at least one of the first crowd or the second crowd correctly performed the second portion of the one or more first tasks and the third portion of the one or more first tasks.

6. The device of claim 5, where the one or more processors are to:
- receive information identifying another task, of the plurality of tasks, to be performed by the crowdsourcing platform; and
- selectively cause at least one of the first crowd, the second crowd, or another crowd associated with the crowdsourcing platform, to perform the other task based on the performance information,
  - the device causing at least one of the first crowd or the second crowd to perform the other task when the performance information indicates that the at least one of the first crowd or the second crowd correctly performed the second portion of the one or more first tasks and the third portion of the one or more first tasks, or
  - the device causing the other crowd to perform the other task when the performance information indicates that the first crowd and the second crowd did not correctly perform the second portion of the one or more first tasks and the third portion of the one or more first tasks.

7. The device of claim 1, where the one or more processors are to:
- determine that the first crowd or the second crowd did not correctly perform the second portion of the one or more first tasks or the third portion of the one or more first tasks; and
- provide the first data and information identifying the second portion of the one or more first tasks and the third portion of the one or more first tasks to another crowd associated with the crowdsourcing platform based on determining that the first crowd or the second crowd did not correctly perform the second portion of the one or more first tasks or the third portion of the one or more first tasks.

8. The device of claim 1, where the one or more processors, when generating the automation model, are to:
- determine one or more first rules that relate to one or more known inputs,
  - the one or more known inputs including unprocessed first data to be processed by the crowdsourcing platform;
- determine one or more second rules that relate to one or more known outputs,
  - the one or more known outputs including processed first data processed by the crowdsourcing platform; and
- generate the automation model based on determining the one or more first rules and determining the one or more second rules.

9. A non-transitory computer-readable medium storing instructions, the instructions comprising:
- one or more instructions that, when executed by one or more processors, cause the one or more processors to:
  - receive first data to be processed;
  - receive information identifying a plurality of tasks to be performed to generate second data based on the first data;
  - compare a first cost, associated with causing a first task, of the plurality of tasks, to be performed by an automation device, and a second cost associated with causing the first task to be performed using a crowdsourcing platform;
  - determine, based on the information identifying the plurality of tasks and comparing the first cost and the second cost, that a first portion of the first task is to be performed by a first crowd associated with the crowdsourcing platform, and that a second portion of the first task is to be performed by a second crowd associated with the crowdsourcing platform, and that a second task, of the plurality of tasks, is to be automatically performed by the automation device;
  - receive input specifying an order in which the plurality of tasks is to be performed by each of the automation device, the first crowd, and the second crowd;
  - provide, to the crowdsourcing platform and the automation device, at least a portion of the first data;
  - cause, based on the order, the first crowd and the second crowd to perform the first task;
  - cause, based on the order, the automation device to perform the second task; and
  - receive, from the automation device and the crowdsourcing platform, the second data,
    - the second data being generated based on the crowdsourcing platform performing the first task and based on the automation device performing the second task;
  - compare the second data to expected data to determine that at least one of the first crowd or the second crowd correctly performed the first task;
  - generate, based on a relationship between the first data and the second data and based on determining that the at least one of the first crowd or the second crowd correctly performed the first task, an automation model,
    - where the one or more instructions, that cause the one or more processors to generate the automation model, cause the one or more processors to:

modify parameters, relating to the relationship between the first data and the second data, for processing, via the automation model, the first task, and train a machine learning model, based on the modified parameters, as the automation model; and provide the automation model to the automation device, the automation model causing the automation device to perform the first task.

10. The computer-readable medium of claim 9, where the one or more instructions, when executed by the one or more processors, cause the one or more processors to:

determine that an output of the first task is used as an input of the second task;

cause the first crowd and the second crowd to perform the first task;

receive the output based on the first crowd and the second crowd performing the first task; and provide the output to the automation device.

11. The computer-readable medium of claim 9, where the one or more instructions, when executed by the one or more processors, cause the one or more processors to:

receive other data from the automation device; and provide the other data to the crowdsourcing platform, the crowdsourcing platform causing workers to perform the first task based on the other data.

12. The computer-readable medium of claim 11, where the other data includes the second data; and where the one or more instructions, that cause the one or more processors to receive the second data, cause the one or more processors to:

receive the second data based on the crowdsourcing platform selecting the second data from the other data.

13. The computer-readable medium of claim 9, where the one or more instructions, that cause the one or more processors to cause the first crowd and the second crowd to perform the first task, cause the one or more processors to:

determine a reward for the first crowd and the second crowd, to be provided if the first crowd and the second crowd correctly perform the first task, the reward being determined based on information identifying past performance of the first crowd and the second crowd.

14. The computer-readable medium of claim 13, where the crowdsourcing platform is to perform a third task of the plurality of tasks; and where the one or more instructions, that cause the one or more processors to cause the crowdsourcing platform to perform the first task, cause the one or more processors to:

cause the first crowd to perform the first task based on the reward associated with the first task; and cause the second crowd to perform the third task based on the second crowd not earning the reward.

15. The computer-readable medium of claim 9, where the one or more instructions, that cause the one or more processors to generate the automation model, cause the one or more processors to:

determine one or more first rules that relate to one or more known inputs, the one or more known inputs including unprocessed first data to be processed by the crowdsourcing platform;

determine one or more second rules that relate to one or more known outputs, the one or more known outputs including processed first data processed by the crowdsourcing platform; and generate the automation model based on determining the one or more first rules and determining the one or more second rules.

16. A method, comprising:

receiving, by a device, first data to be processed;

receiving, by the device, information identifying a plurality of tasks to be performed to generate second data based on the first data;

comparing, by the device, a first cost, associated with causing a first task, of the plurality of tasks, to be performed by an automation device, and a second cost associated with causing the first task to be performed using a crowdsourcing platform;

determining, by the device, and based on the information identifying the plurality of tasks and based on comparing the first cost and the second cost, that a first portion of the first task is to be performed by a first crowd associated with the crowdsourcing platform, that a second portion of the first task is to be performed by a second crowd associated with the crowdsourcing platform, and that a second task, of the plurality of tasks, is to be performed by the automation device;

receiving, by the device, input specifying an order in which the plurality of tasks are to be performed by each of the automation device, the first crowd, and the second crowd;

providing, by the device and to the crowdsourcing platform and the automation device, at least a portion of the first data;

causing, by the device and based on the order, the first crowd and the second crowd to perform the first task;

causing, by the device, the automation device to perform the second task;

receiving, by the device and from the automation device and the crowdsourcing platform, the second data, the second data being generated based on the first crowd and the second crowd performing the first task and based on the automation device performing the second task;

comparing, by the device, the second data to expected data to determine that at least one of the first crowd or the second crowd correctly performed the first task;

generating, by the device, based on a relationship between the first data and the second data, and based on determining that the at least one of the first crowd or the second crowd correctly performed the first task, an automation model, where generating the automation model comprises:

modifying, by the device, parameters, relating to the relationship between the first data and the second data, for processing, via the automation model, the first task, and training, by the device and based on the modified parameters, a machine learning model as the automation model; and providing, by the device, the automation model to the automation device, the automation model causing the automation device to perform the first task.

17. The method of claim 16, where causing the automation device to perform the second task comprises:
- receiving, from the crowdsourcing platform and based on the first crowd and the second crowd performing the first task with regard to the first data, intermediate data;
- providing, to the automation device, the intermediate data; and
- causing a second device to perform a search based on the intermediate data.

18. The method of claim 16, further comprising:
- determining whether a third task, of the plurality of tasks, is to be performed by the automation device or by the crowdsourcing platform,
  - the automation device performing the third task when the information identifying the plurality of tasks indicates that the automation device is to perform the third task, and
  - the crowdsourcing platform performing the third task when the information identifying the plurality of tasks does not indicate that the automation device is to perform the third task.

19. The method of claim 16, further comprising:
- providing, for display, a user interface based on the first data, the first task, the crowdsourcing platform, the second task, the automation device, or the second data.

20. The method of claim 16, wherein:
- the second data comprises:
  - first processed data obtained as a result of the first crowd and the second crowd performing the first task, and
  - second processed data obtained as a result of the automation device performing the second task;
- the method further comprises:
  - identifying, as the relationship between the first data and the second data, a difference between the first data and the first processed data; and
- generating the automation model comprises:
  - generating the automation model based on the difference between the first data and the first processed data.

* * * * *